(12) United States Patent
Yako et al.

(10) Patent No.: US 12,235,159 B2
(45) Date of Patent: Feb. 25, 2025

(54) FILTER ARRAY AND LIGHT DETECTION SYSTEM

(71) Applicant: Panasonic Intellectual Property Management Co., Ltd., Osaka (JP)

(72) Inventors: Motoki Yako, Osaka (JP); Atsushi Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 179 days.

(21) Appl. No.: 18/051,870

(22) Filed: Nov. 1, 2022

(65) Prior Publication Data

US 2023/0092032 A1 Mar. 23, 2023

Related U.S. Application Data

(63) Continuation of application No. PCT/JP2021/017029, filed on Apr. 28, 2021.

(30) Foreign Application Priority Data

May 29, 2020 (JP) ................................. 2020-093885

(51) Int. Cl.
*G01J 3/28* (2006.01)
*G02B 5/20* (2006.01)
(Continued)

(52) U.S. Cl.
CPC ............ *G01J 3/2823* (2013.01); *G02B 5/201* (2013.01); *G02B 5/284* (2013.01); *G02B 26/001* (2013.01);
(Continued)

(58) Field of Classification Search
CPC .......... G02B 5/201; G02B 5/285; G02B 5/28; G02B 3/0056; G02B 5/284; G02B 26/001;
(Continued)

(56) References Cited

U.S. PATENT DOCUMENTS 5,144,498 A 9/1992 Vincent
9,570,491 B2 * 2/2017 Li ..................... H01L 27/14623
(Continued)

FOREIGN PATENT DOCUMENTS

EP 4 053 521 9/2022
EP 4 092 397 11/2022
(Continued)

OTHER PUBLICATIONS

Extended European Search Report issued in corresponding European Patent Application No. 21814517.5.
(Continued)

*Primary Examiner* — Michael P Stafira
(74) *Attorney, Agent, or Firm* — Wenderoth, Lind & Ponack, L.L.P.

(57) ABSTRACT

A filter array includes optical filters that are disposed in a two-dimensional plane. At least one optical filter of the optical filters includes an interference layer having a first surface and a second surface opposite the first surface, and a reflective layer provided on the first surface. A transmission spectrum of the at least one optical filter has maximum values. The reflective layer is not provided on the second surface.

13 Claims, 22 Drawing Sheets

(51) Int. Cl.
*G02B 5/28* (2006.01)
*G02B 26/00* (2006.01)
*G02B 3/00* (2006.01)

(52) U.S. Cl.
CPC ..... *G01J 2003/2826* (2013.01); *G02B 3/0056* (2013.01)

(58) Field of Classification Search
CPC .......... G02B 5/288; G02B 5/20; G02B 5/286; G02B 1/002; G02B 1/005; G02B 1/11; G02B 2207/123; G02B 3/0062; G02B 3/0075; G02B 5/223; G02B 2005/1804; G02B 27/0075; G02B 5/1814; G02B 5/1819; G02B 5/1866; G02B 5/22; G02B 5/26; G02B 5/281; G02B 1/14; G02B 21/06; G02B 23/2469; G02B 27/141; G02B 30/00; G02B 30/33; G02B 30/50; G02B 5/001; G02B 5/203; G02B 5/3033; G02B 5/32; G02B 6/0043; G02B 6/0061; G02B 1/12; G02B 27/42; G02B 27/4216; G02B 27/4233; G02B 27/46; G02B 27/60; G02B 3/005; G02B 30/22; G02B 5/0215; G02B 5/0257; G02B 5/0294; G02B 5/30; G02B 5/3025; G02B 6/0033; G02B 6/0051; G02B 6/0053; G02B 6/0056; G02B 6/0065; G02B 30/52; G02B 30/36; G02B 5/0221; G02B 3/0043; G02B 5/045; G02B 5/1871; G02B 6/0068; G02B 2027/0178; G02B 27/0172; G02B 30/27; G02B 2027/0112; G02B 2027/0118; G02B 2027/0127; G02B 2027/0138; G02B 2027/014; G02B 2027/0174; G02B 2027/0187; G02B 26/0808; G02B 26/0816; G02B 27/0093; G02B 27/0179; G02B 30/10; G02B 30/26; G02B 27/0927; G02B 6/002; G02B 6/0026; G02B 6/0031; G02B 6/0055; G02B 6/0073; G02B 6/0091; G02B 27/62; G02B 30/32; G02B 5/287; G02B 27/0018; G02B 27/0961; G02B 5/0268; G02B 5/0278; G02B 6/29358; G02B 6/29395; G02B 6/29398; G02B 6/4204; G02B 6/4206; G02B 6/4214; G02B 6/4215; G02B 6/4224; G02B 6/4225; G02B 6/4249; G02B 6/4259; G02B 6/4266; G02B 2006/12102; G02B 2006/12109; G02B 2027/012; G02B 2027/0129; G02B 2027/0134; G02B 23/12; G02B 27/0037; G02B 27/0955; G02B 27/28; G02B 27/286; G02B 27/30; G02B 27/4238; G02B 27/4244; G02B 3/0006; G02B 3/0031; G02B 30/20; G02B 30/25; G02B 5/003; G02B 5/1809; G02B 5/1895; G02B 5/207; G02B 5/283; G02B 5/3016; G02B 6/0088; G02B 6/132; G02B 6/136; G01J 3/26; G01J 3/2823; G01J 2003/2826; G01J 3/2803; G01J 2003/2806; G01J 2003/1213; G01J 2003/1226; G01J 3/28; G01J 2003/1217; G01J 3/36; G01J 3/513; G01J 3/12; G01J 5/20; G01J 2003/283; G01J 2003/516; G01J 2003/1234; G01J 2003/1278; G01J 2003/1291; G01J 2003/2813; G01J 2003/2866; G01J 3/0205; G01J 3/0208; G01J 3/0229; G01J 3/0256; G01J 3/0259; G01J 3/0262; G01J 3/0289; G01J 3/1256; G01J 3/18; G01J 3/457; G01J 3/10; G01J 3/021; G01J 3/0237; G01J 3/0272; G01J 3/0291; G01J 2003/1204; G01J 2003/1861; G01J 2003/282; G01J 3/0224; G01J 3/0297; G01J 2003/062; G01J 2003/123; G01J 2003/1269; G01J 3/0216; G01J 3/06; G01J 3/14; G01J 3/32; G01J 3/4532; G01J 3/44; G01J 3/51

See application file for complete search history.

(56) References Cited

U.S. PATENT DOCUMENTS

| | | | |
|---|---|---|---|
| 2009/0225204 A1 | 9/2009 | Inaba et al. | |
| 2012/0092666 A1 | 4/2012 | Meijer et al. | |
| 2013/0032915 A1 | 2/2013 | Tonotani et al. | |
| 2014/0175265 A1 | 6/2014 | Gonzalez et al. | |
| 2015/0221691 A1* | 8/2015 | Watanabe | H04N 25/133 257/432 |
| 2016/0091633 A1* | 3/2016 | Yoshihiro | G02B 1/115 359/581 |
| 2016/0138975 A1 | 5/2016 | Ando et al. | |
| 2016/0240573 A1* | 8/2016 | Yamamoto | G02B 5/201 |
| 2018/0335554 A1 | 11/2018 | Ockenfuss | |
| 2021/0341657 A1* | 11/2021 | Ishikawa | G02B 5/285 |

FOREIGN PATENT DOCUMENTS

| | | | |
|---|---|---|---|
| EP | 4 160 169 | 4/2023 | |
| EP | 4 239 682 | 9/2023 | |
| JP | 4-213403 | 8/1992 | |
| JP | 2012-064824 | 3/2012 | |
| JP | 2012-530271 | 11/2012 | |
| JP | 2013-038091 | 2/2013 | |
| JP | 2018-164153 | 10/2018 | |
| JP | 2020-53910 | 4/2020 | |
| WO | 2007/094092 | 8/2007 | |
| WO | WO-2020014031 A1 * | 1/2020 | ......... A61B 1/00009 |

OTHER PUBLICATIONS

International Search Report of PCT application No. PCT/JP2021/017029 dated Jul. 27, 2021.

* cited by examiner

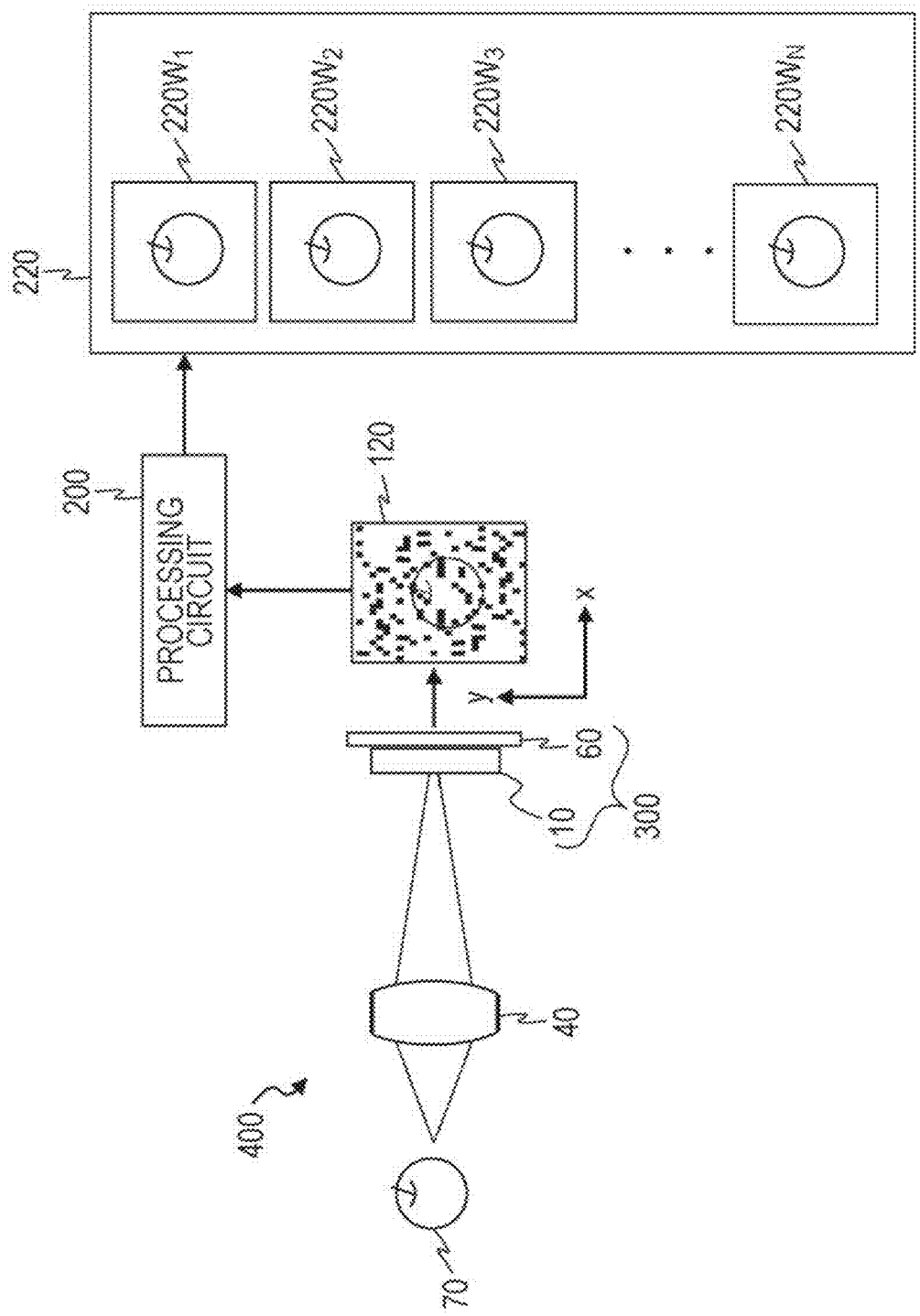

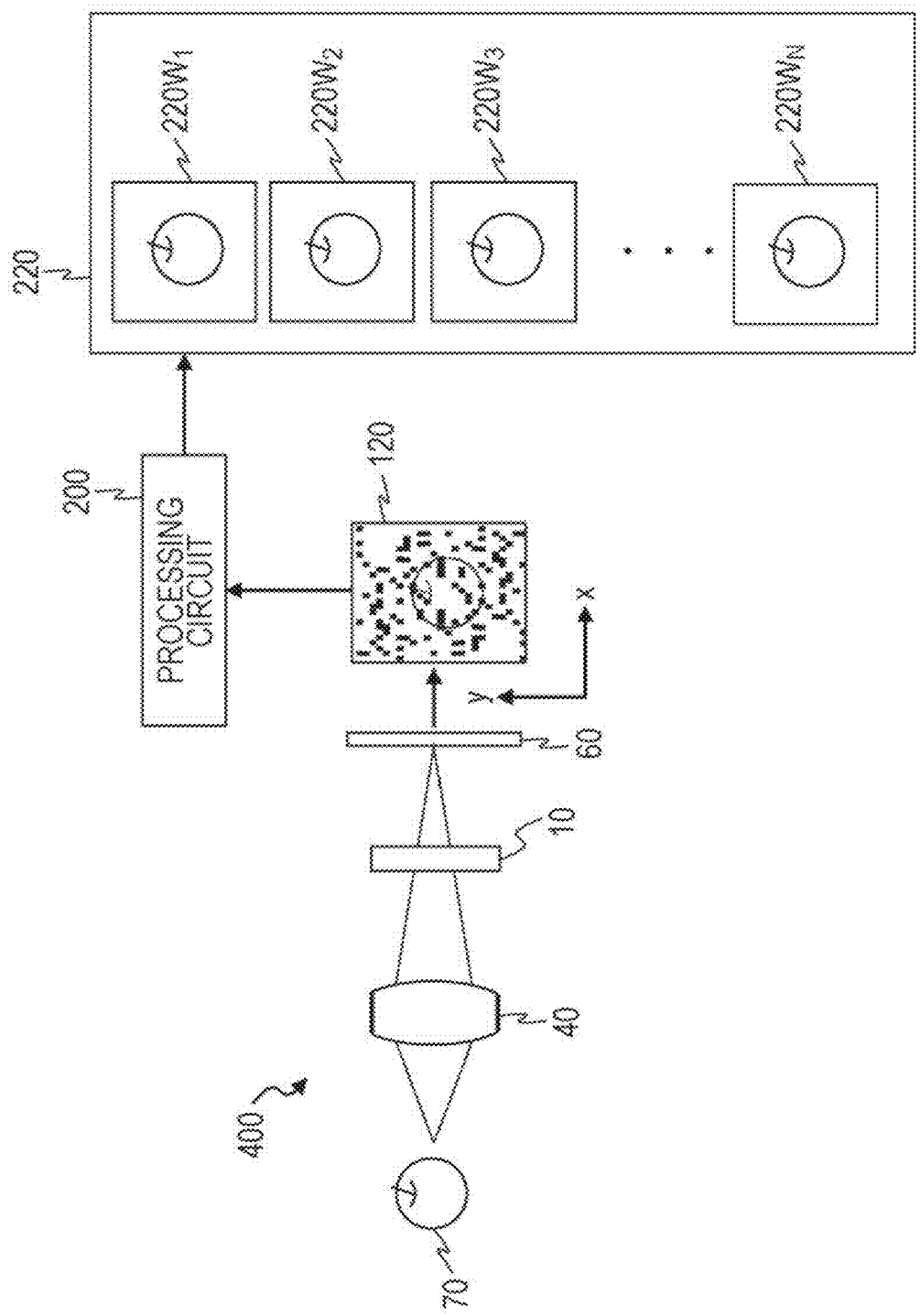

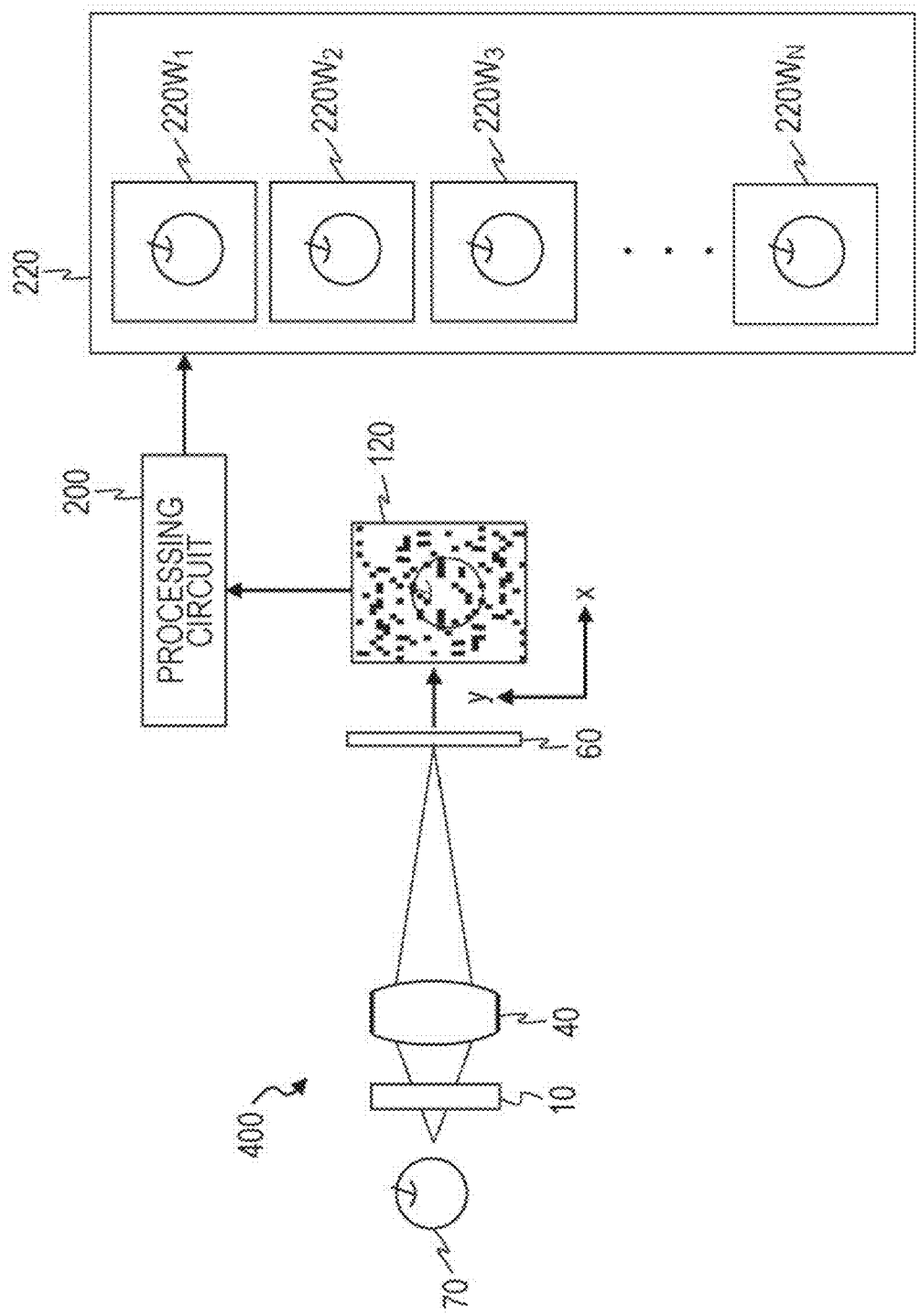

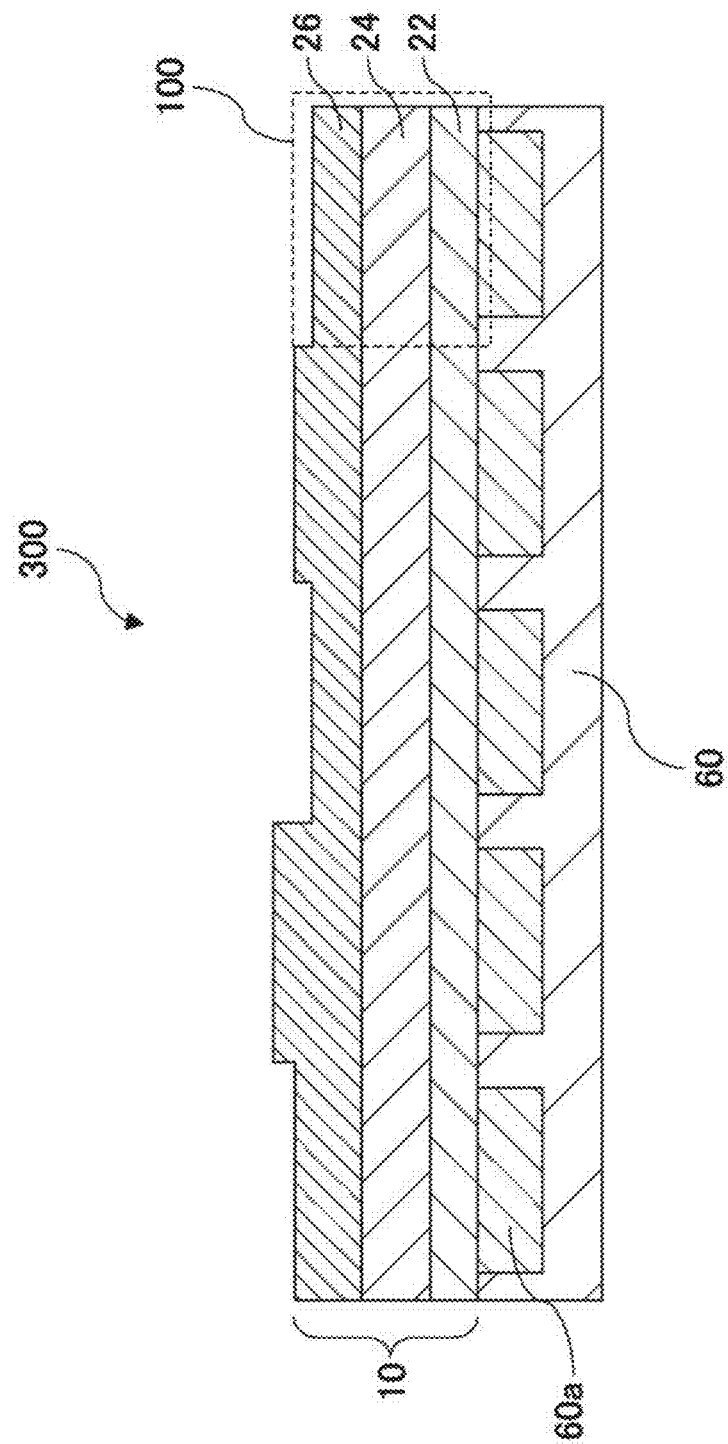

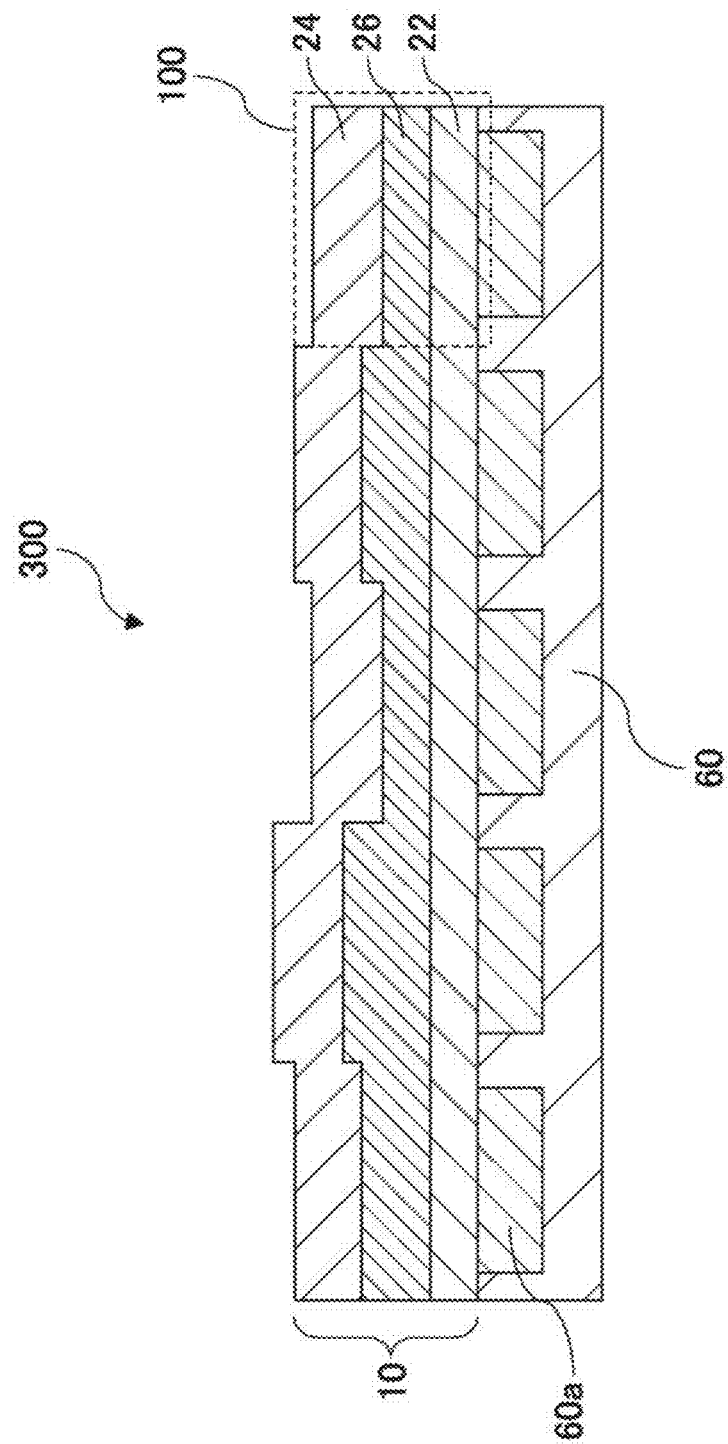

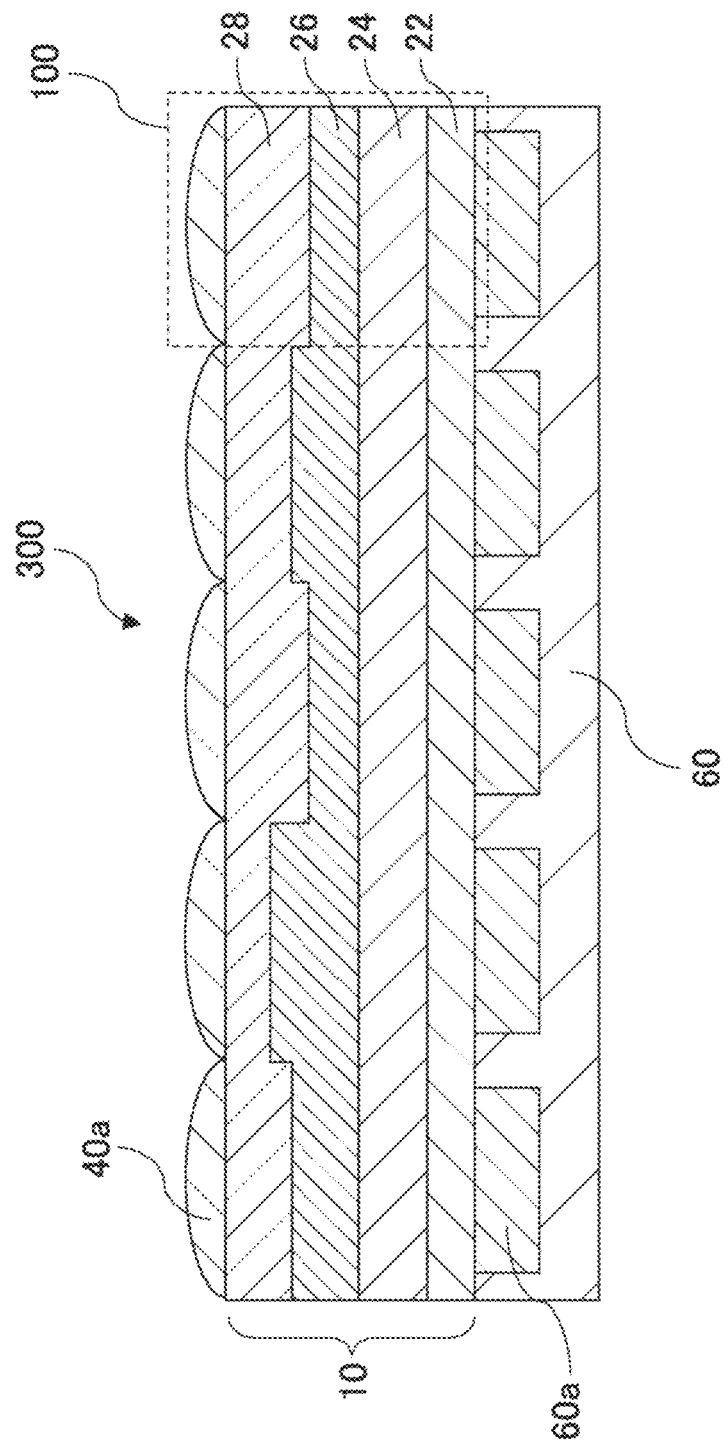

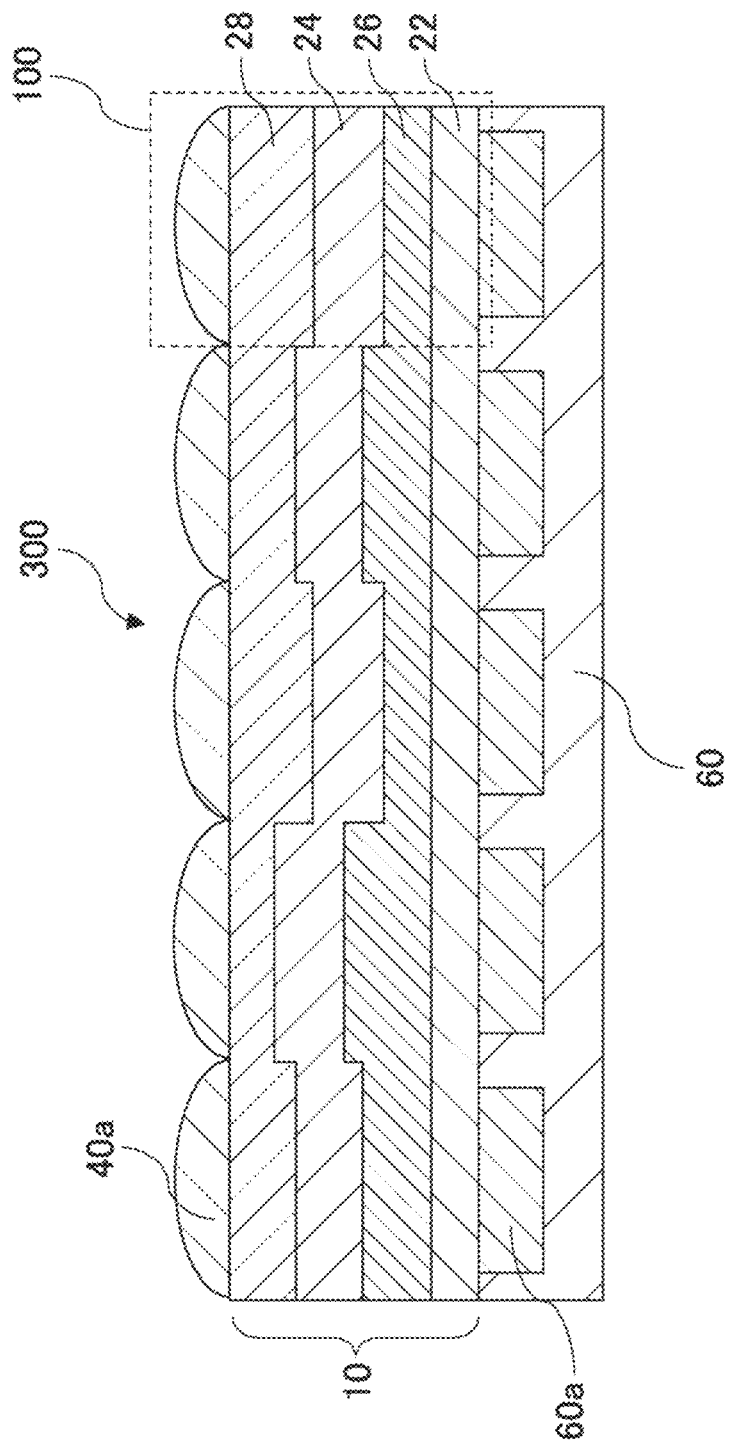

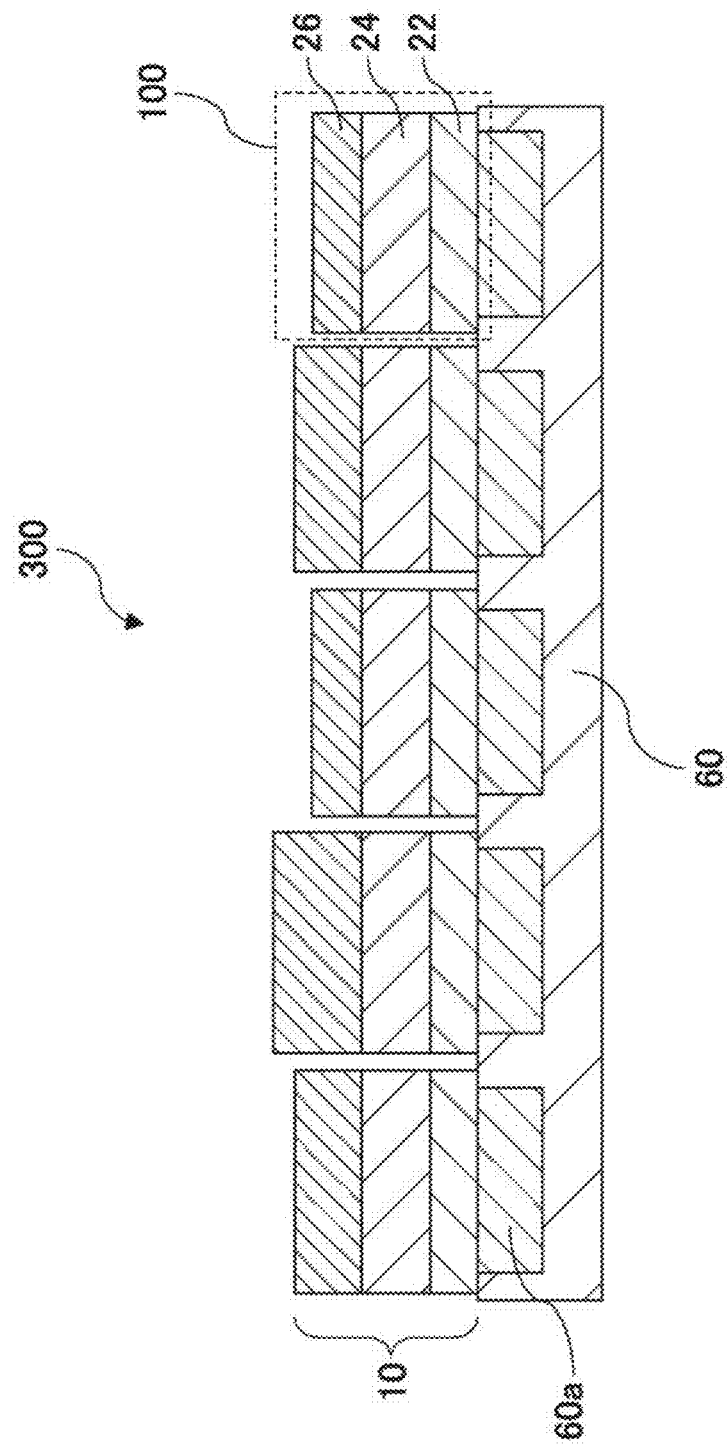

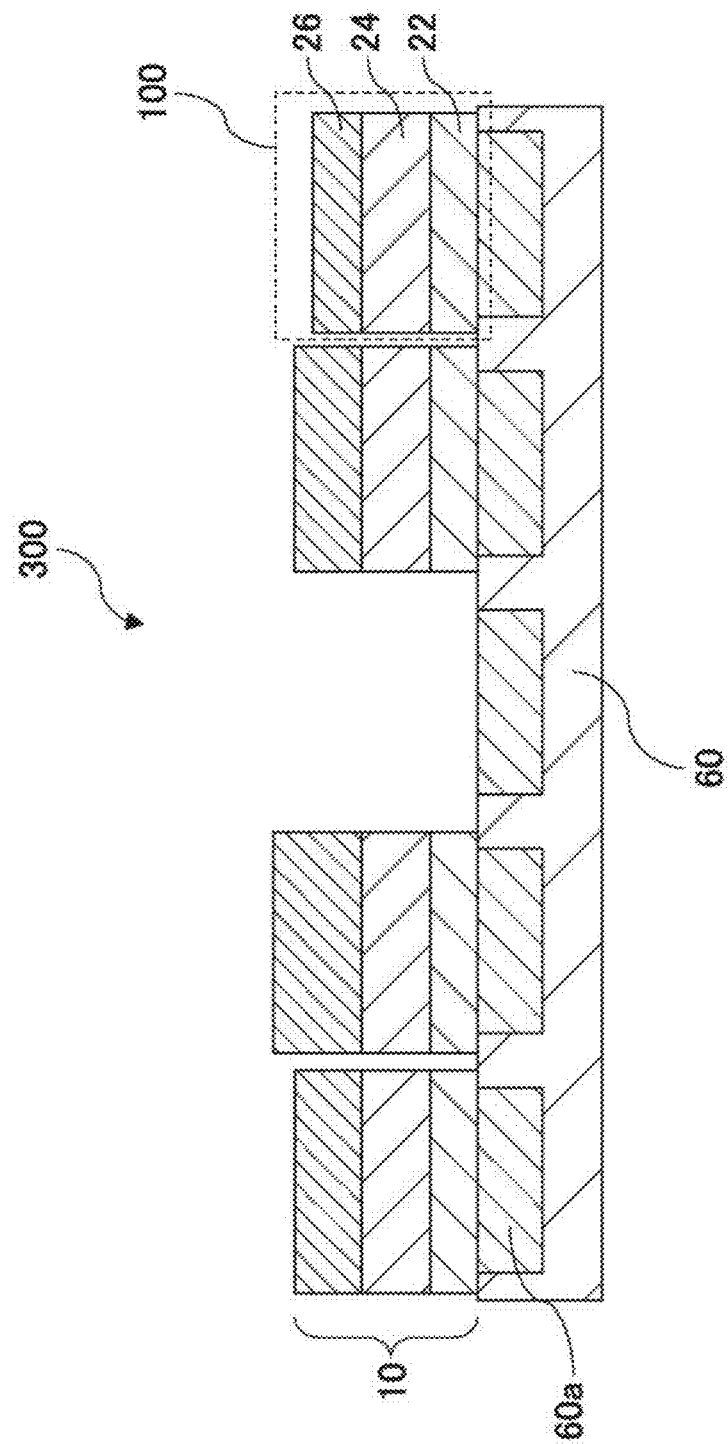

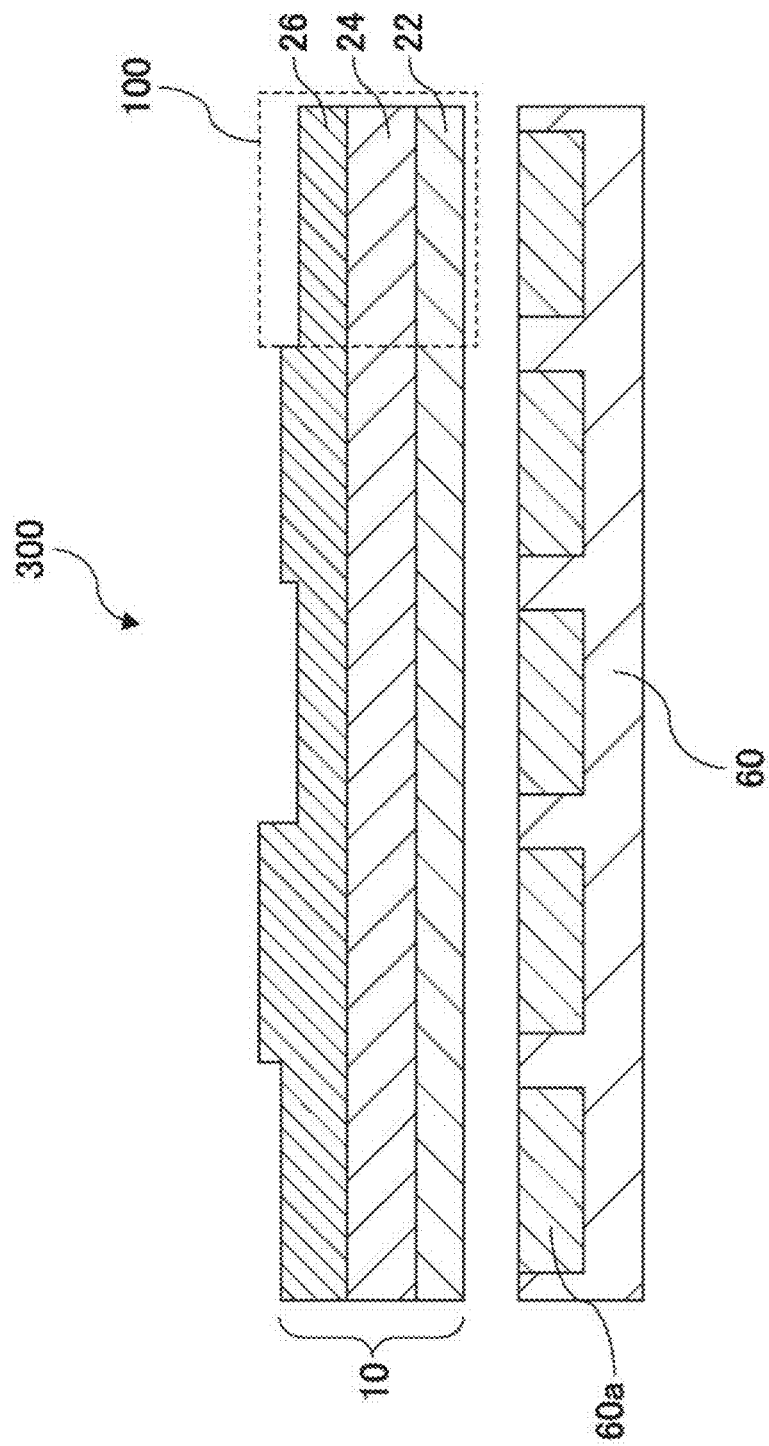

FILTER ARRAY AND LIGHT DETECTION SYSTEM

BACKGROUND

1. Technical Field

The present disclosure relates to filter arrays and light detection systems.

2. Description of the Related Art

By utilizing spectral information about a large number of bands, such as several tens of bands, each being a narrow band, detailed characteristics of a target object can be ascertained, which is not possible with a conventional RGB image. A camera that acquires such multi-wavelength information is called a "hyperspectral camera". Hyperspectral cameras are used in various fields, such as in food inspection, biological examination, drug development, and mineral component analysis.

U.S. Pat. No. 9,599,511 discloses an example of a hyperspectral imaging device that utilizes compressed sensing. This imaging device includes an encoder as an array of optical filters with different wavelength dependency with respect to light transmittance, an image sensor that detects light transmitted through the encoder, and a signal processing circuit. The encoder is disposed on an optical path that connects a subject and the image sensor. For each pixel, the image sensor simultaneously detects light on which components of wavelength bands are superimposed, so as to acquire a single wavelength-multiplexed image. The signal processing circuit utilizes information about the spatial distribution of spectral transmittance of the encoder so as to apply compressed sensing to the acquired wavelength-multiplexed image, thereby generating image data for each wavelength band. In the imaging device disclosed in U.S. Pat. No. 9,599,511, an optical filter array having at least two transmittance peaks (i.e., maximum values) within a target wavelength range is used as the encoder.

U.S. Pat. No. 9,466,628 discloses an example of a filter array including a Fabry-Perot resonator in which a dielectric multilayer film is used as a reflective layer.

SUMMARY

One non-limiting and exemplary embodiment provides a light detection system that can improve the spectral resolution and the detection light intensity of a hyperspectral camera, and a filter array used in the light detection system.

In one general aspect, the techniques disclosed here feature a filter array including optical filters that are disposed in a two-dimensional plane. At least one optical filter of the optical filters includes an interference layer having a first surface and a second surface opposite the first surface, and a reflective layer provided on the first surface. A transmission spectrum of the at least one optical filter has maximum values. The reflective layer is not provided on the second surface.

According to the technology of the present disclosure, the spectral resolution and the detection light intensity of a hyperspectral camera can be improved.

General or specific aspects of the present disclosure may be implemented as a system, a device, a method, an integrated circuit, a computer program, or a storage medium, such as a computer-readable storage disk, or may be implemented as a freely-chosen combination of a system, a device, a method, an integrated circuit, a computer program, and a storage medium. The computer-readable storage medium may include a nonvolatile storage medium, such as a CD-ROM (compact disc-read only memory). The device may be constituted of one or more devices. If the device is constituted of two or more devices, the two or more devices may be disposed within a single apparatus, or may be disposed separately within two or more separate apparatuses. In this description and the claims, the term "device" may refer not only to a single device but also to a system formed of devices.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A schematically illustrates a light detection system according to an exemplary embodiment;

FIG. 1B illustrates a configuration example of the light detection system in which a filter array is disposed away from an image sensor;

FIG. 1C illustrates a configuration example of the light detection system in which the filter array is disposed away from the image sensor;

FIG. 5A is a cross-sectional view schematically illustrating a first example of the light detection device;

FIG. 5B is a cross-sectional view schematically illustrating a second example of the light detection device;

FIG. 9A is a cross-sectional view schematically illustrating a fifth example of the light detection device;

FIG. 9B is a cross-sectional view schematically illustrating a sixth example of the light detection device;

FIG. 11A schematically illustrates a first modification of the first example illustrated in FIG. 5A;

FIG. 11B schematically illustrates a second modification of the first example illustrated in FIG. 5A;

FIG. 11C schematically illustrates a third modification of the first example illustrated in FIG. 5A.

DETAILED DESCRIPTIONS

Figure 1D:
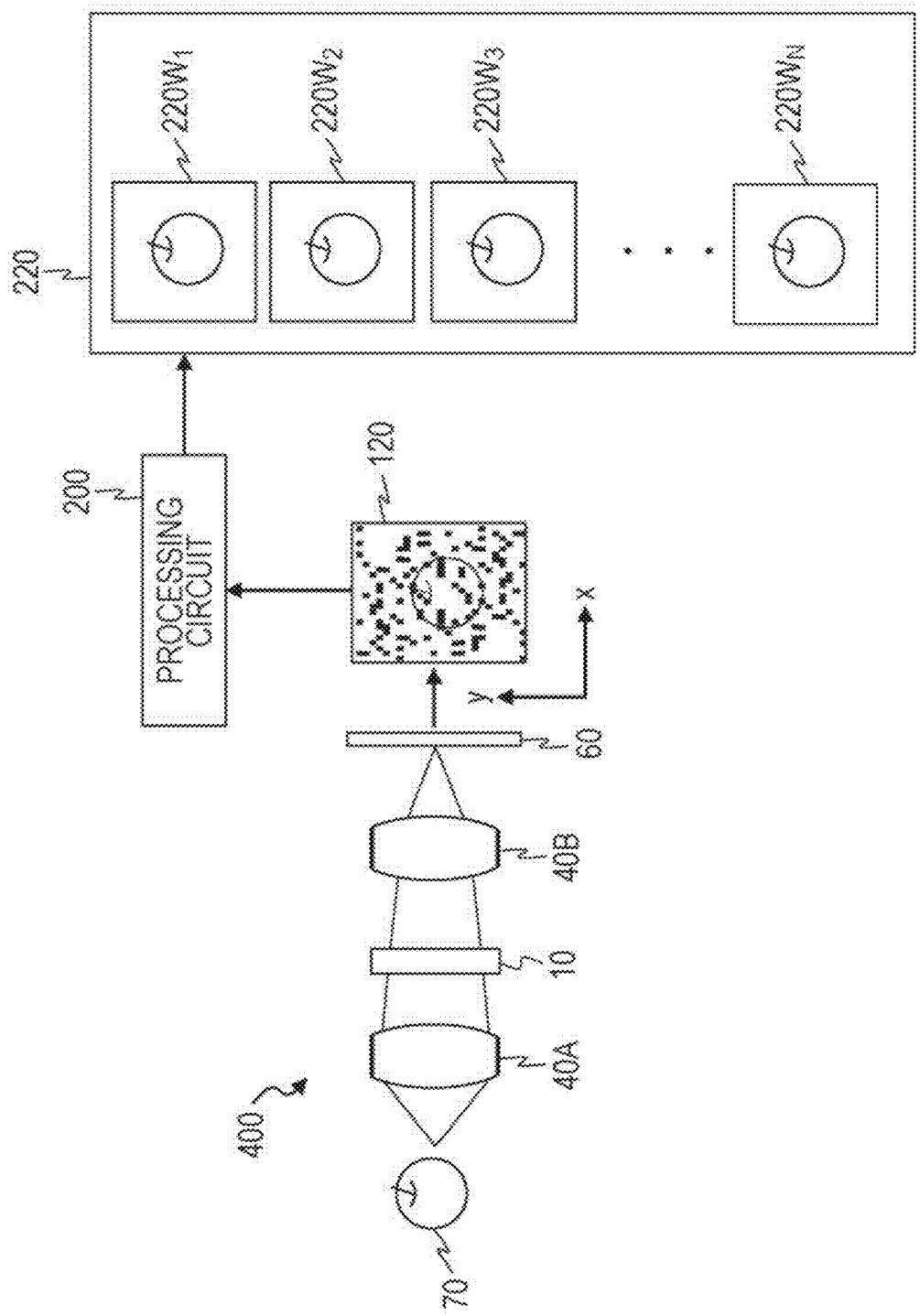
FIG. 1D illustrates a configuration example of the light detection system in which the filter array is disposed away from the image sensor.

Exemplary embodiments of the present disclosure will be described below. The embodiments to be described below indicate general or specific examples. Numerical values, shapes, components, positions and connection methods of the components, steps, and the sequence of the steps are examples and are not intended to limit the scope of the present disclosure. Of the components in the following embodiments, a component not defined in the independent claim indicating the most generic concept is described as a freely-chosen component. Furthermore, the drawings are not necessarily exact illustrations. In each drawing, same reference signs are given to substantially identical components, and redundant descriptions may sometimes be omitted or simplified.

Before describing the embodiments of the present disclosure, the underlying knowledge forming the basis of the present disclosure will be described.

U.S. Pat. No. 9,599,511 discloses an imaging device capable of generating high-resolution multi-wavelength images, that is, images with respect to individual wavelength bands. In this imaging device, an image of light from a target object is encoded by an optical element called an "encoder" and is captured. The encoder has, for example, two-dimensionally-arranged regions. A transmission spectrum of each of at least two of the regions has a maximum transmittance value in each of wavelength ranges within a wavelength range serving as an imaging target. For example, the regions may respectively be disposed in correspondence with pixels of an image sensor. In an imaging process using the aforementioned encoder, data of each pixel contains information about the wavelength ranges. In other words, image data acquired in the imaging process is data containing compressed wavelength information. Therefore, the amount of data can be minimized by simply retaining two-dimensional data. For example, even in a case where a storage medium is limited in capacity, long-duration moving-image data can be acquired. The multi-wavelength images are generated by performing a reconstruction process involving reconstructing the image captured in the imaging process. The multi-wavelength images correspond one-to-one to the wavelength ranges. In the following description, each of the images generated and corresponding one-to-one to the wavelength ranges, that is, wavelength bands, may also be referred to as "spectral image".

The encoder may be realized by, for example, a filter array including two-dimensionally-arranged filters. For example, each filter may have the structure of a so-called Fabry-Perot resonator that includes two reflective layers and an interference layer located therebetween. As a Fabry-Perot resonator, for example, the structure disclosed in U.S. Pat. No. 9,466,628 may be employed. The filters may be designed such that the transmission spectrum of each filter has peaks in the wavelength range serving as the imaging target.

The aforementioned filter array may have the following challenges. The transmission spectrum of the filter array may change between vertical incidence and oblique incidence. As a result, the spectral resolution of the multi-wavelength image may possibly deteriorate. Furthermore, in a case where the two reflective layers in the Fabry-Perot resonator both have relatively high reflectance in the target wavelength range, the transmittance between two neighboring peaks in the transmission spectrum of a filter significantly decreases. As a result, the detection light intensity in the multi-wavelength image may possibly decrease.

In a filter array according to an embodiment of the present disclosure, an interference layer has two surfaces located at opposite sides from each other. The two surfaces have a fixed difference in reflectance with respect to light in the target wavelength range. Such a filter array reduces the possibility in which the spectral resolution and the detection light intensity of a hyperspectral camera decrease. A filter array according to an embodiment of the present disclosure and a light detection system according to the present disclosure equipped with the filter array will be briefly described below.

First Item

A filter array according to a first item includes optical filters that are disposed in a two-dimensional plane. At least one optical filter of the optical filters includes an interference layer having a first surface and a second surface opposite the first surface, and a reflective layer provided on the first surface. A transmission spectrum of the at least one optical filter has maximum values. The reflective layer is not provided on the second surface.

In this filter array, a change in a transmission spectrum due to a change in the light incident angle can be suppressed, and a loss in the amount of transmitted light can be suppressed. As a result, the possibility in which the spectral resolution and the detection light intensity of a hyperspectral camera decrease can be reduced.

Second Item

In the filter array according to the first item, the reflective layer may include at least one selected from the group consisting of a distributed Bragg reflector and a metallic film.

In this filter array, a reflective layer that efficiently reflects light within the specific wavelength range can be realized.

Third Item

In the filter array according to the second item, the distributed Bragg reflector may include at least one set of a first refractive-index layer and a second refractive-index layer. A refractive index of the first refractive-index layer may be higher than a refractive index of the second refractive-index layer.

In this filter array, the reflectance of the distributed Bragg reflector can be appropriately designed by increasing or decreasing the number of sets of first refractive-index layers and second refractive-index layers.

Fourth Item

In the filter array according to the third item, a thickness of the first refractive-index layer may be $\lambda/(4n_H)$ and a thickness of the second refractive-index layer may be $\lambda/(4n_L)$, and a thickness of the interference layer may be greater than $\lambda/(2n_H)$, where $\lambda$ denotes a wavelength included in a specific wavelength range having the maximum values, $n_H$ denotes the refractive index of the first refractive-index layer, and $n_L$ denotes the refractive index of the second refractive-index layer.

In this filter array, light with the wavelength $\lambda$ can be efficiently reflected.

Fifth Item

In the filter array according to the second item, a thickness of the metallic film may be larger than or equal to 1 nm and smaller than or equal to 100 nm.

In this filter array, the transmittance of the metallic film can be increased by appropriately adjusting the thickness of the metallic film.

Sixth Item

In the filter array according to any one of the first to fifth items, the at least one optical filter may further include a transparent layer. The interference layer may be disposed between the transparent layer and the reflective layer.

Seventh Item

In the filter array according to any one of the first to fifth items, the at least one optical filter may further include a transparent layer. The reflective layer may be disposed between the transparent layer and the interference layer.

In these filter arrays, the transparent layer can protect the optical filters and can suppress reflection of light entering a resonant cavity.

Eighth Item

In the filter array according to the sixth or seventh item, the at least one optical filter may further include a micro-lens located on the transparent layer.

In this filter array, light collected by the micro-lens can be made to efficiently enter the optical filters.

Ninth Item

A light detection system according to a ninth item includes the filter array according to any one of the first to eighth items, and an image sensor that is disposed at a position where the image sensor receives light transmitted through the optical filters.

In this light detection system, a hyperspectral camera with improved spectral resolution and increased detection light intensity can be realized.

Tenth Item

The light detection system according to the ninth item may further include a processing circuit that generates spectral image data corresponding to each of wavelength bands based on data indicating a spatial distribution of transmission spectra of the optical filters and image data acquired by the image sensor. The optical filters may include a first optical filter and a second optical filter having transmission spectra different from each other.

In the present disclosure, each circuit, unit, device, member, or section or each functional block in each block diagram may entirely or partially be implemented by, for example, one or more electronic circuits containing a semiconductor device, semiconductor IC (integrated circuit), or LSI (large scale integration). The LSI or the IC may be integrated in a single chip or may be configured by combining chips. For example, the functional blocks excluding storage elements may be integrated in a single chip. Although the terms "LSI" and "IC" are used here, the terms used may change depending on the degree of integration, such that so-called "system LSI", "VLSI" (very large scale integration), or "ULSI" (ultra large scale integration) may be used. A field programmable gate array (FPGA) to be programmed after the LSI is manufactured, or a reconfigurable logic device that can reconfigure the connection relationship inside the LSI or can set up the circuit sections inside the LSI can also be used for the same purpose.

Furthermore, the function or operation of each circuit, unit, device, member, or section may entirely or partially be implemented by software processing. In this case, the software is stored in a non-transitory storage medium, such as one or more ROM (read-only memory) units, an optical disk, or a hard disk drive. When the software is executed by a processor, a function specified by the software is implemented by the processor and a peripheral device. A system or a device may include one or more non-transitory storage media storing the software, a processor, and a required hardware device, such as an interface.

EMBODIMENTS

Light Detection System

FIG. 1A schematically illustrates a light detection system 400 according to an exemplary embodiment of the present disclosure. The light detection system 400 includes an optical unit 40, a filter array 10, an image sensor 60, and a processing circuit 200. The filter array 10 has a function similar to that of the "encoder" disclosed in U.S. Pat. No. 9,599,511. Therefore, the filter array 10 may also be referred to as an "encoder". The optical unit 40 and the filter array 10 are disposed on an optical path of light incident from a target object 70. In the example illustrated in FIG. 1A, the filter array 10 is disposed between the optical unit 40 and the image sensor 60.

In FIG. 1A, an apple is illustrated as an example of the target object 70. The target object 70 is not limited to an apple and may be a freely-chosen object. Based on image data generated by the image sensor 60, the processing circuit 200 generates image data with respect to each of wavelength bands included in a specific wavelength range (also referred to as "target wavelength range" hereinafter). This image data will be referred to as "spectral image data" in this description. The number of wavelength bands included in the target wavelength range will be defined as N (N being an integer greater than or equal to 4). In the following description, the spectral image data to be generated with respect to the wavelength bands will be referred to as spectral images $220W_1, 220W_2, \ldots,$ and $220W_N$, and these spectral images will collectively be referred to as spectral images 220. In this description, a signal indicating an image, that is, a group of signals indicating pixel values of pixels constituting an image, may sometimes be simply referred to as "image".

The filter array 10 includes translucent filters arranged in rows and columns. The filter array 10 is an optical element in which the light transmission spectrum, that is, wavelength dependency with respect to light transmittance, varies from filter to filter. The filter array 10 modulates the intensity of incident light for each wavelength range and allows the incident light to pass through.

In the example illustrated in FIG. 1A, the filter array 10 is disposed close to or directly on the image sensor 60. The expression "close to" implies that the filter array 10 is close to the image sensor 60 to an extent that an image of light from the optical unit 40 is formed on a surface of the filter array 10 in a state where the image is clear to a certain extent. The expression "directly on" implies that the two are close to each other with hardly any gap therebetween. The filter array 10 and the image sensor 60 may be integrated with each other. In this description, a device that includes the filter array 10 and the image sensor 60 will be referred to as "light detection device 300".

The optical unit 40 includes at least one lens. Although illustrated as a single lens in FIG. 1A, the optical unit 40 may be constituted of a combination of lenses. The optical unit 40 forms an image on an imaging surface of the image sensor 60 via the filter array 10.

The filter array 10 may be disposed away from the image sensor 60. FIGS. 1B to 1D each illustrate a configuration example of the light detection system 400 in which the filter array 10 is disposed away from the image sensor 60. In the example in FIG. 1B, the filter array 10 is disposed at a position located between the optical unit 40 and the image sensor 60 and away from the image sensor 60. In the example in FIG. 1C, the filter array 10 is disposed between the target object 70 and the optical unit 40. In the example in FIG. 1D, the light detection system 400 includes two optical units 40A and 40B, and the filter array 10 is disposed therebetween. As in these examples, an optical unit including at least one lens may be disposed between the filter array 10 and the image sensor 60. The filter array 10, the optical unit 40, and the image sensor 60 may have atmospheric air filling the spaces therebetween, or may be sealed with gas, such as nitrogen gas.

The image sensor 60 includes two-dimensionally-arranged light detection elements. The image sensor 60 may be, for example, a CCD (charge-coupled device) sensor, a CMOS (complementary metal oxide semiconductor) sensor, or an infrared array sensor. The light detection elements may include, for example, photodiodes. The image sensor 60 may be, for example, a monochrome-type sensor or a color-type sensor. The target wavelength range may be set arbitrarily. The target wavelength range is not limited to a visible wavelength range, and may be an ultraviolet, near-infrared, mid-infrared, far-infrared, or microwave wavelength range.

In the example illustrated in FIG. 1A, each light detection element is disposed facing one of the filters. Each light detection element has sensitivity to light in the wavelength range serving as the imaging target. In detail, each light detection element has substantial sensitivity required for detecting light in the wavelength range serving as the imaging target. For example, the external quantum efficiency of each light detection element in the aforementioned wavelength range may be higher than or equal to 1%. The external quantum efficiency of each light detection element may be higher than or equal to 10%. The external quantum efficiency of each light detection element may be higher than or equal to 20%. In the following description, each light detection element may also be referred to as "pixel".

The processing circuit 200 may be, for example, an integrated circuit that includes a processor and a storage medium, such as a memory. Based on an image 120 acquired by the image sensor 60, the processing circuit 200 generates data of the spectral images 220 respectively containing information about the wavelength bands. The spectral images 220, as well as a method for processing an image signal in the processing circuit 200, will be described in detail later. The processing circuit 200 may be incorporated in the light detection device 300, or may be a component of a signal processing device electrically connected to the light detection device 300 in a wired or wireless manner.

Filter Array

The filter array 10 according to this embodiment will be described below. The filter array 10 is disposed on the optical path of light incident from a target object and modulates the intensity of the incident light for each wavelength before outputting the light. This process performed by a filter array, that is, an encoder, is referred to as "encoding" in this description.

Figure 2A:
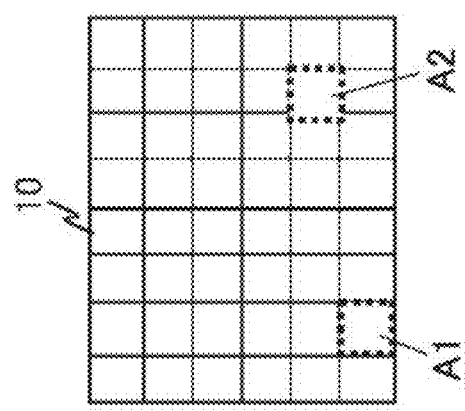
FIG. 2A schematically illustrates an example of a filter array according to an exemplary embodiment.

FIG. 2A schematically illustrates an example of the filter array 10. The filter array 10 includes two-dimensionally-arranged filters. Each filter has an individually-set transmission spectrum. The transmission spectrum is expressed as a function $T(\lambda)$, where $\lambda$ denotes the wavelength of incident light. The transmission spectrum $T(\lambda)$ may have a value greater than or equal to 0 and less than or equal to 1.

In the example illustrated in FIG. 2A, the filter array 10 has 48 rectangular filters arranged in a 6 row by 8 column matrix. This is merely an example, and a larger number of filters may be set in actual application. For example, the number may be about the same as the number of pixels in the image sensor 60. The number of filters included in the filter array 10 is set in accordance with the intended usage within a range of, for example, several tens to several thousands of filters.

Figure 2B:
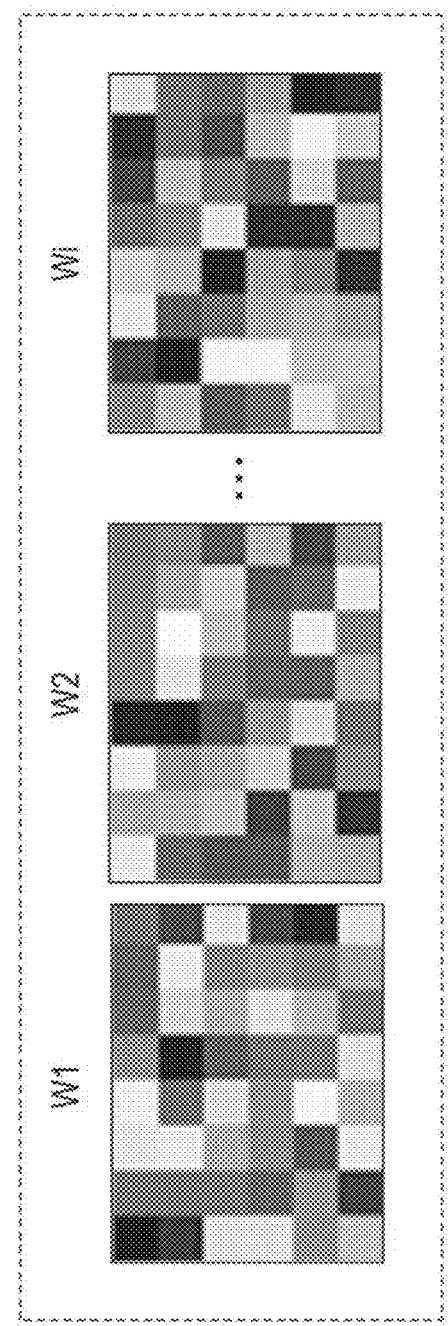
FIG. 2B illustrates an example of a spatial distribution of light transmittance in each of wavelength ranges included in a target wavelength range.

FIG. 2B illustrates an example of a spatial distribution of light transmittance for each of wavelength ranges W1, W2, . . . , and Wi included in the target wavelength range. In the example illustrated in FIG. 2B, the differences in the gradation levels of the filters indicate differences in transmittance. A paler filter has higher transmittance, whereas a darker filter has lower transmittance. As illustrated in FIG. 2B, the spatial distribution of light transmittance varies from wavelength range to wavelength range.

Figure 2C:
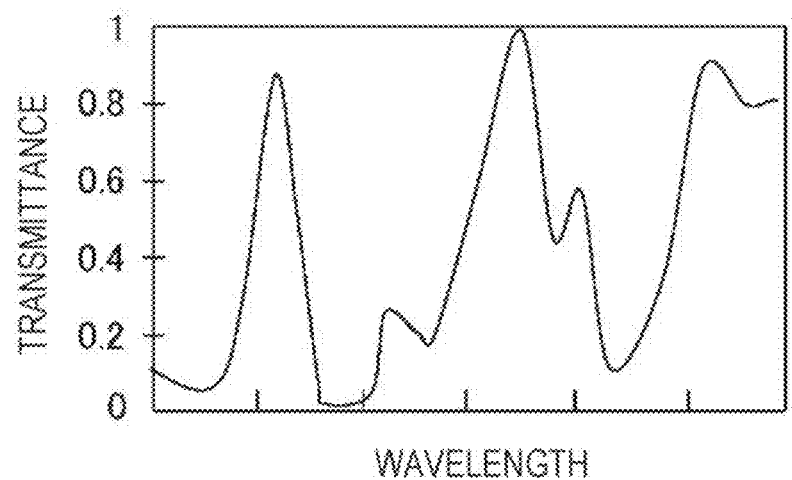
FIG. 2C illustrates an example of a transmission spectrum of a certain filter included in the filter array illustrated in FIG. 2A.
Figure 2D:
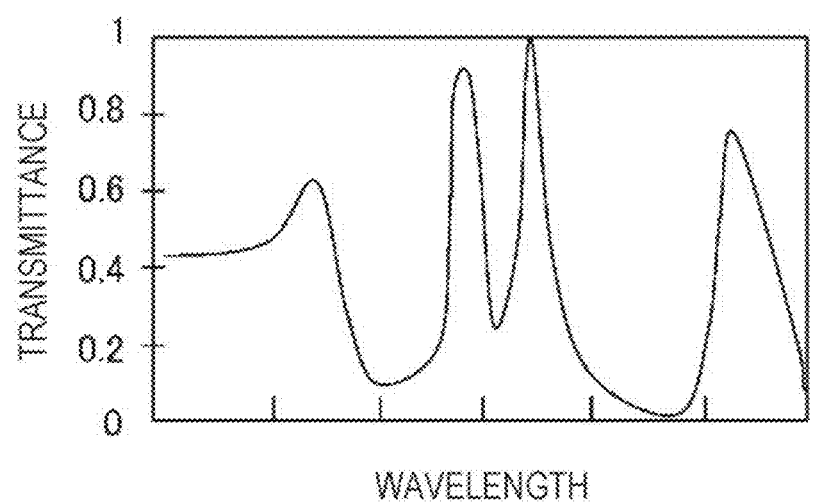
FIG. 2D illustrates an example of a transmission spectrum of another filter included in the filter array illustrated in FIG. 2A.

FIGS. 2C and 2D illustrate examples of transmission spectra of a filter A1 and a filter A2 included in the filters of the filter array 10 in FIG. 2A. The transmission spectrum of the filter A1 and the transmission spectrum of the filter A2 are different from each other. Accordingly, the transmission spectrum of the filter array 10 varies from filter to filter. However, not all the filters need to have different transmission spectra. In the filter array 10, at least two of the filters have transmission spectra different from each other. In other words, the filter array 10 includes two or more filters with different transmission spectra. In one example, the number of transmission spectrum patterns of the filters included in the filter array 10 may be equal to or greater than the number i of wavelength ranges included in the target wavelength range. The filter array 10 may be designed such that at least half of the filters have different transmission spectra. In this description, differences among transmission spectra of optical filters may imply a difference between transmission spectra of at least two optical filters of the optical filters.

Figure 3A:
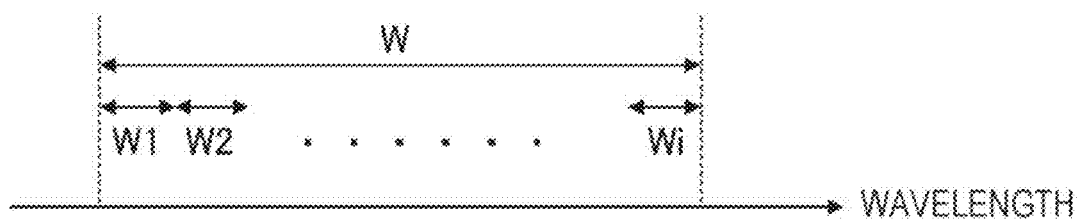
FIG. 3A is a diagram for explaining an example of the relationship between the target wavelength range and wavelength ranges included therein.
Figure 3B:
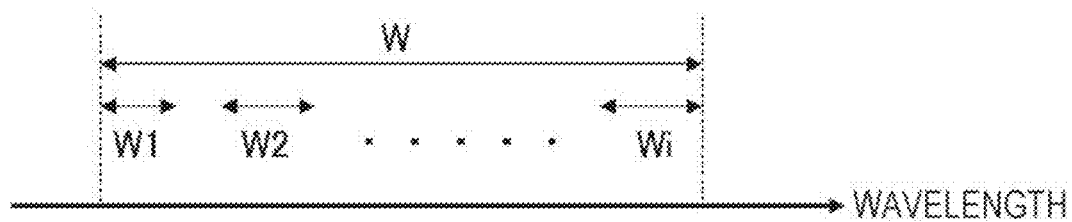
FIG. 3B is a diagram for explaining another example of the relationship between the target wavelength range and the wavelength ranges included therein.

FIGS. 3A and 3B are diagrams for explaining the relationship between a target wavelength range W and the wavelength ranges W1, W2, . . . , and Wi included therein. The target wavelength range W may be set to any of various ranges in accordance with the intended usage. For example, the target wavelength range W may be a visible-light wavelength range from approximately 400 nm to approximately 700 nm, a near-infrared wavelength range from approximately 700 nm to approximately 2500 nm, or a near-ultraviolet wavelength range from approximately 10 nm to approximately 400 nm. Alternatively, the target wavelength range W may be a radio-wave range, such as a mid-infrared, far-infrared, terahertz-wave, or millimeter-wave range. Accordingly, the wavelength range to be used is not limited to a visible-light range. In this description, nonvisible light, such as a near-ultraviolet ray, a near-infrared ray, and a radio wave, in addition to visible light will be referred to as "light" for the sake of convenience.

In the example illustrated in FIG. 3A, the target wavelength range W is equally divided by i into a wavelength range W1, a wavelength range W2, . . . , and a wavelength range Wi, where i denotes a freely-chosen integer greater than or equal to 4. However, the example is not limited to this. The wavelength ranges included in the target wavelength range W may be set arbitrarily. For example, the bandwidths may be nonuniform among the wavelength ranges. There may be a gap between neighboring wavelength ranges. In the example illustrated in FIG. 3B, the bandwidth varies from wavelength range to wavelength range, and a gap exists between two neighboring wavelength ranges. Accordingly, the wavelength ranges may be different from each other, and may be set arbitrarily. The division number i for the wavelengths may be less than or equal to 3.

Figure 4A:
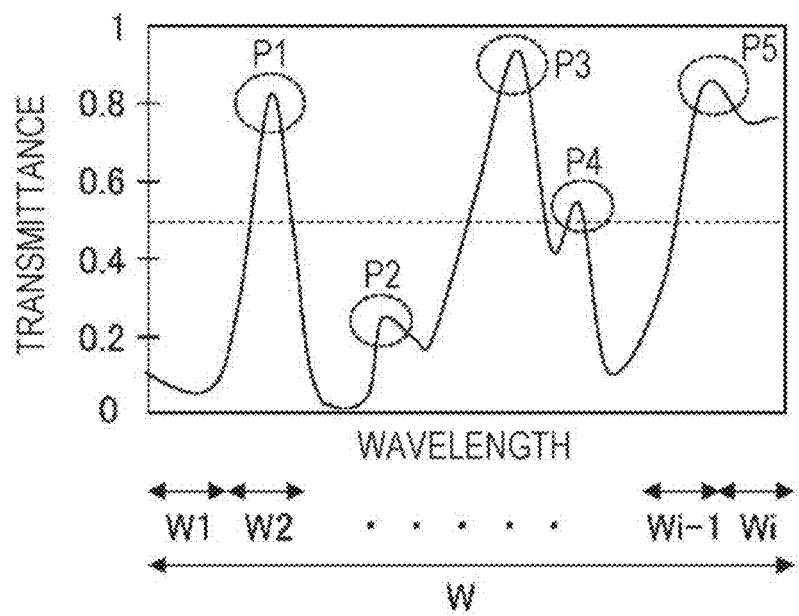
FIG. 4A is a diagram for explaining the characteristic of a transmission spectrum of a certain filter in the filter array.

FIG. 4A is a diagram for explaining the characteristic of a transmission spectrum of a certain filter in the filter array 10. In the example illustrated in FIG. 4A, the transmission spectrum has a maximum value P1 to a maximum value P5 and minimum values with respect to wavelengths within the target wavelength range W. In the example illustrated in FIG. 4A, the light transmittance within the target wavelength range W is normalized such that the maximum value thereof is 1 and the minimum value thereof is 0. In the example illustrated in FIG. 4A, the transmission spectrum has maximum values in wavelength ranges, such as the wavelength range W2 and a wavelength range Wi-1. Accordingly, in this embodiment, the transmission spectrum of each filter has maximum values in at least two wavelength ranges from the wavelength range W1 to the wavelength range Wi. It is apparent from FIG. 4A that the maximum value P1, the maximum value P3, the maximum value P4, and the maximum value P5 are greater than or equal to 0.5.

Accordingly, the light transmittance of each filter varies from wavelength to wavelength. Therefore, the filter array 10 transmits a large amount of incident light in certain wavelength ranges and does not transmit much of the incident light in other wavelength ranges. For example, the transmittance with respect to light in k wavelength ranges among i wavelength ranges may be higher than 0.5, whereas the transmittance with respect to light in the remaining (i-k) wavelength ranges may be lower than 0.5. In this case, k denotes an integer satisfying the relationship 2≤k<i. Supposing that the incident light is white light uniformly containing all wavelength components of visible light, the filter array 10 modulates the incident light into light having discrete intensity peaks with respect to the wavelengths for each filter, superimposes the multi-wavelength light, and outputs the light.

Figure 4B:
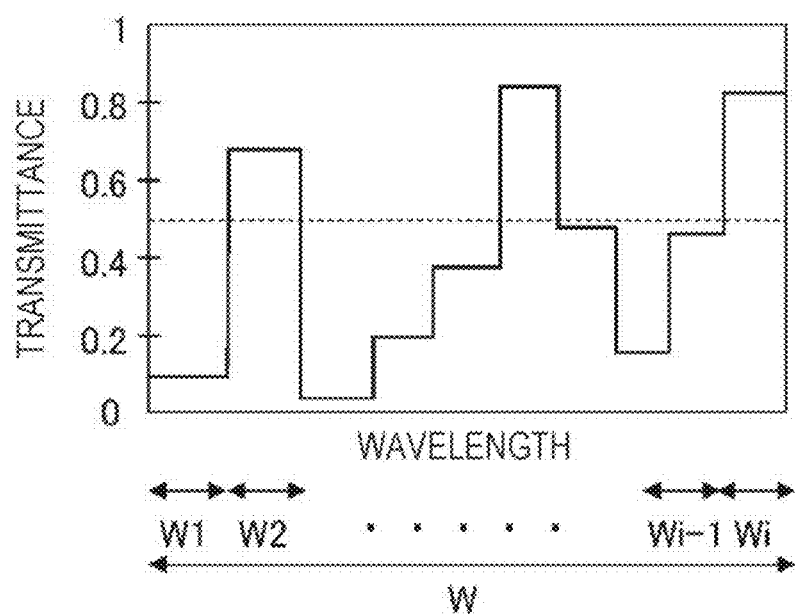
FIG. 4B illustrates a result obtained by averaging the transmission spectrum illustrated in FIG. 4A for each wavelength range.

FIG. 4B illustrates an example of a result obtained by averaging the transmission spectrum illustrated in FIG. 4A for each of the wavelength range W1, the wavelength range W2, . . . , and the wavelength range Wi. Averaged transmittance is obtained by integrating the transmission spectrum $T(\lambda)$ for each wavelength range and dividing the integral value by the bandwidth of the wavelength range. In this description, a transmittance value averaged for each wavelength range in this manner will be referred to as transmittance in that wavelength range. In this example, transmittance is outstandingly high in the three wavelength ranges having the maximum value P1, the maximum value P3, and the maximum value P5. In particular, the transmittance exceeds 0.8 in the two wavelength ranges having the maximum value P3 and the maximum value P5.

The resolution in the wavelength direction of the transmission spectrum of each filter may be set to about the bandwidth of a desired wavelength range. In other words, in a wavelength range including one maximum value in a transmission spectrum curve, the width of a range having a value greater than or equal to an average value between a minimum value closest to the maximum value and the maximum value may be set to about the bandwidth of the desired wavelength range. In this case, the transmission spectrum may be decomposed into frequency components by, for example, a Fourier transform, so that the value of a frequency component corresponding to the wavelength range relatively increases.

As illustrated in FIG. 2A, the filter array 10 typically has filters segmented into a grid-like pattern. These filters partially or entirely have transmission spectra different from each other. The light-transmittance wavelength distribution and spatial distribution of the filters included in the filter array 10 may be, for example, a random distribution or a semi-random distribution.

The concepts of a random distribution and a semi-random distribution are as follows. First, each filter in the filter array 10 may be regarded as, for example, a vector component having a value of 0 to 1 in accordance with the light transmittance. In a case where the transmittance is 0, the value of the vector component is 0. In a case where the transmittance is 1, the value of the vector component is 1. In other words, a group of filters arranged in a single line in the row direction or the column direction may be regarded as a multidimensional vector having a value from 0 to 1. Therefore, it may be regarded that the filter array 10 includes multidimensional vectors in the row direction or the column direction. In this case, a random distribution means that two freely-chosen multidimensional vectors are independent, that is, not parallel. A semi-random distribution means that the multidimensional vectors partially include a non-independent configuration. Therefore, in a random distribution and a semi-random distribution, a vector having a light transmittance value in a first wavelength range as an element in each filter belonging to a group of filters included in the filters and arranged in one row or column and a vector having a light transmittance value in the first wavelength range as an element in each filter belonging to a group of filters arranged in another row or column are independent from each other. With regard to a second wavelength range different from the first wavelength range, a vector having a light transmittance value in the second wavelength range as an element in each filter belonging to a group of filters included in the filters and arranged in one row or column and a vector having a light transmittance value in the second wavelength range as an element in each filter belonging to a group of filters arranged in another row or column are independent from each other.

In a case where the filter array 10 is disposed close to or directly on the image sensor 60, the spacing between the filters included in the filter array 10 may substantially match the pixel pitch of the image sensor 60. Accordingly, the resolution of an encoded image of light output from the filter array 10 substantially matches the resolution of pixels. Light transmitted through each cell enters only a single corresponding pixel, so that an arithmetic process to be described later can be readily performed. In a case where the filter array 10 is disposed away from the image sensor 60, the pitch of the cells may be set finely in accordance with the distance.

In the examples illustrated in FIGS. 2A to 2D, the filter array 10 has a gray-scale transmittance distribution in which the transmittance of each filter may be a freely-chosen value that is greater than or equal to 0 and less than or equal to 1. However, such a gray-scale transmittance distribution is not necessarily essential. For example, a binary-scale transmittance distribution in which the transmittance of each filter may have a value of either substantially 0 or substantially 1 may be employed. In a binary-scale transmittance distribution, each filter transmits a large portion of light in at least two wavelength ranges of the wavelength ranges included in the target wavelength range, and does not transmit a large portion of light in the remaining wavelength ranges. The expression "large portion" refers to substantially 80% or higher.

Of all the filters, some of them, such as half of the filters, may be replaced with transparent filters. Such transparent filters transmit light in all the wavelength ranges W1 to Wi included in the target wavelength range with about the same high transmittance. For example, the high transmittance is higher than or equal to 0.8. In such a configuration, the transparent filters may be arranged in, for example, a checkboard pattern. In other words, in two arrangement directions of the filters in the filter array 10, filters whose light transmittance varies in accordance with the wavelength and transparent filters may be alternately arranged. In the example illustrated in FIG. 2A, the two arrangement directions are a horizontal direction and a vertical direction.

Such data indicating the spatial distribution of the spectral transmittance of the filter array 10 is preliminarily acquired based on design data or actual measurement calibration, and is stored in a storage medium included in the processing circuit 200. The data is used in an arithmetic process to be described later.

The filter array 10 may be constituted by using, for example, a multilayer film, an organic material, a diffraction grating structure, or a metal-containing micro-structure. In a case where a multilayer film is to be used, for example, a dielectric multilayer film or a multilayer film including a metallic layer may be used. In this case, the filter array 10 may be formed such that at least one of the thickness, the material, and the stacked order of each multilayer film varies for each cell. Accordingly, spectral characteristics that vary from cell to cell can be realized. By using a multilayer film, sharp rising and falling in spectral transmittance can be realized. A configuration that uses an organic material may be realized by varying a contained pigment or dye from cell to cell, or by stacking different types of materials. A configuration that uses a diffraction grating structure may be realized by providing a diffracting structure with a diffraction pitch or depth that varies from cell to cell. In a case where a metal-containing micro-structure is to be used, the filter array 10 may be fabricated by utilizing spectroscopy based on a plasmon effect.

Processing Circuit

Next, a method for generating multi-wavelength spectral images 220 in a reconstruction process by using the processing circuit 200 will be described. The term "multi-wavelength" refers to, for example, wavelength ranges larger in number than the three color wavelength ranges of RGB acquired by a normal color camera. The number of wavelength ranges may be, for example, four to about 100. The number of wavelength ranges may also be referred to as "the number of spectral bands". Depending on the intended usage, the number of spectral bands may exceed 100.

Spectral images 220 to be desirably obtained are expressed as f. Assuming that the number of spectral bands is defined as w, the data f is obtained by integrating image data $f_1$, $f_2$, . . . , and $f_w$ of respective bands. As illustrated in FIG. 1A, the horizontal direction of an image is defined as an x direction, and the vertical direction of an image is defined as a y direction. Assuming that the number of pixels in the x direction of image data to be obtained is defined as n and the number of pixels in the y direction is defined as m, each piece of image data $f_1$, $f_2$, . . . , and $f_w$ is two-dimensional data with n×m pixels. Therefore, the data f is three-dimensional data with n×m×w elements. On the other hand, the number of elements in data g of the image 120 acquired by being encoded and multiplexed by the filter array 10 is n×m. The data g can be expressed using Expression (1) indicated below:

$$g = Hf = H \begin{bmatrix} f_1 \\ f_2 \\ \vdots \\ f_w \end{bmatrix} \quad (1)$$

In this case, $f_1$, $f_2$, . . . , and $f_w$ each denote data having n×m elements. Therefore, a vector at the right-hand side is strictly a one-dimensional vector of n×m×w rows and one column. A vector g is expressed and calculated by being converted into a one-dimensional vector of n×m rows and one column. A matrix H expresses a transform involving encoding and intensity-modulating components $f_1$, $f_2$, . . . , and $f_w$ of a vector f with encoding information that varies for each wavelength range and adding the components together. Therefore, H is a matrix of n×m rows and n×m×w columns.

If the vector g and the matrix H are given, it appears as if f can be calculated by solving an inverse problem of Expression (1). However, since the number of elements n×m×w in the data f to be obtained is greater than the number of elements n×m in the acquisition data g, this problem is an ill-posed problem and cannot be solved as is. The processing circuit 200 utilizes the redundancy of the image included in the data f to obtain a solution by using a compressed sensing technique. In detail, the data f to be obtained is estimated by solving Expression (2) indicated below:

$$f' = \underset{f}{\operatorname{argmin}} \{ \|g - Hf\|_{l_2} + \tau \Phi(f) \} \quad (2)$$

In this case, f' denotes estimated data of f. The first term in the parentheses in the above expression indicates an amount of deviation, that is, a so-called residual term, between an estimation result Hf and the acquisition data g. Although a square sum is set as the residual term here, an absolute value or a root-sum-square value may be set as the residual term. The second term in the parentheses is a regularization term or a stabilization term to be described later. Expression (2) involves determining f that minimizes the sum of the first term and the second term. The processing circuit 200 can converge on solution in accordance with a recursive iterative operation so as to ultimately calculate a solution f'.

The first term within the parentheses in Expression (2) indicates an arithmetic process involving determining a square sum of a difference between the acquisition data g and Hf obtained by performing a system conversion on f in the estimation process using the matrix H. In the second term, Φ(f) denotes a limiting condition in the regularization of f, and is a function having sparse information of the estimation data reflected therein. With regard to the function, there is an advantage of making the estimation data smooth or stable. The regularization term may be expressed by, for example, a discrete cosine transform (DCT) of f, a wavelet transform, a Fourier transform, or a total variation (TV). For example, if a total variation is used, stable estimation data in which the effect of noise in the observation data g is reduced can be acquired. The sparse characteristics of the target object 70 in the space of each regularization term vary depending on the texture of the target object 70. A regularization term in which the texture of the target object 70 becomes sparser in the space of the regularization term may be selected. Alternatively, regularization terms may be included in the arithmetic process. τ denotes a weighting factor. The larger the weighting factor τ, the amount of cutback of redundant data increases, thus increasing the percentage to be compressed. The smaller the weighting factor τ, the weaker the convergence to the solution. The weighting factor τ is set to an appropriate value at which f converges to a certain extent and that does not lead to over-compression.

In the configurations in FIGS. 1B to 1D, an image encoded by the filter array 10 is acquired in a blurry state on the imaging surface of the image sensor 60. Therefore, by preliminarily storing this blurriness information and reflecting this blurriness information on the aforementioned system matrix H, spectral images 220 can be generated in a reconstruction process. The blurriness information can be expressed by a point spread function (PSF). A PSF is a function that defines the degree of spreading of a point image toward surrounding pixels. For example, if a point image corresponding to one pixel in an image spreads to a k×k pixel region surrounding the pixel due to blurriness, the PSF may be defined as a coefficient group, that is, a matrix, indicating an effect on the brightness of the pixels within the region. By reflecting the effect of blurriness of the encoding pattern by the PSF on the system matrix H, spectral images 220 can be generated in a reconstruction process. Although the filter array 10 may be disposed at a freely-chosen position, a position where the encoding pattern of the filter array 10 does not spread too much and disappear may be selected.

Although an arithmetic example using compressed sensing indicated in Expression (2) is described here, a solution may be obtained by using another method. For example, another statistical method, such as a maximum likelihood estimation method or a Bayes estimation method, may be used. Furthermore, the number of spectral images 220 is arbitrary, and the wavelength ranges may also be set arbitrarily. The reconstruction method is disclosed in detail in U.S. Pat. No. 9,599,511. The entire disclosure contents of U.S. Pat. No. 9,599,511 are incorporated in this description.

Filter Array Equipped with Fabry-Perot Filters

Next, an example of a specific structure of the filter array 10 according to this embodiment will be described with reference to FIGS. 5A and 5B. FIGS. 5A and 5B are cross-sectional views schematically illustrating a first example and a second example, respectively, of the light detection device 300. Each cross-sectional view illustrates an example of a cross-sectional structure of one of the rows of the filter array 10 illustrated in FIG. 2A and the image sensor 60. In the examples illustrated in FIGS. 5A and 5B, the filter array 10 is disposed on the image sensor 60. Light detection elements 60a included in the image sensor 60 are respectively positioned directly below the filters 100 included in the filter array 10. The filter array 10 and the image sensor 60 may be separated from each other. Even in that case, each light detection element 60a may be disposed at a position where it receives light transmitted through one of the filters. The components may be disposed such that light transmitted through the filters enters the light detection elements 60a via a mirror. In that case, each light detection element 60a is not disposed directly below one of the filters.

The filters 100 included in the filter array 10 according to this embodiment each have a structure of a resonant cavity. The structure of the resonant cavity refers to a structure in which light with a certain wavelength forms a standing wave and exists stably therein. A resonant cavity illustrated in FIG. 5A includes a substrate 22, a reflective layer 24, and an interference layer 26 stacked in this order. A resonant cavity illustrated in FIG. 5B includes a substrate 22, an interference layer 26, and a reflective layer 24 stacked in this order. The substrate 22 illustrated in each of FIGS. 5A and 5B is provided uniformly throughout all the filters 100 without any steps. Unlike the reflective layer 24 illustrated in FIG. 5B, the reflective layer 24 illustrated in FIG. 5A is provided uniformly throughout all the filters 100 without any steps. As illustrated in FIGS. 5A and 5B, the interference layer 26 and the reflective layer 24 may be stacked in a freely-chosen order. The substrate 22 is not necessarily essential. The reflective layer 24 may include, for example, a distributed Bragg reflector (DBR). The configuration of the reflective layer 24 will be described in detail later. The interference layers 26 included in the filters 100 have different refractive indices and/or different thicknesses. The transmission spectra of the filters 100 vary depending on the refractive index and/or the thickness of the interference layer 26. The transmission spectrum of each filter 100 has maximum transmittance values at various wavelengths within the target wavelength range W.

In the filter array 10 according to this embodiment, at least one filter of the filters 100 may have the aforementioned resonant cavity, whereas the other filters do not have to have the aforementioned resonant cavity. For example, the filter array 10 may include a filter, such as a transparent filter or an ND filter (neutral density filter), not having wavelength dependency with respect to light transmittance.

In the first example, the interference layer 26 may be exposed to atmospheric air. Components, such as a lens and a protection cover, may be disposed above the surface of the interference layer 26 with a space therebetween. In this case, the space may be filled with atmospheric air, or may be sealed with gas, such as nitrogen gas. The same applies to the surface of the reflective layer 24 in the second example.

Figure 6A:
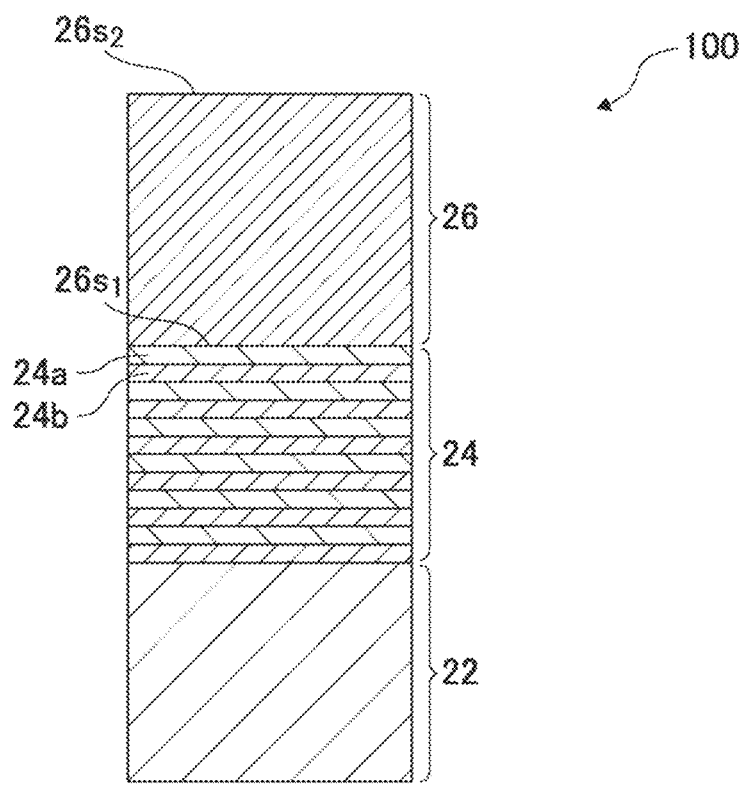
FIG. 6A schematically illustrates an example of a filter illustrated in FIG. 5A.

Next, an example of the configuration of each filter 100 will be described with reference to FIG. 6A. FIG. 6A schematically illustrates an example of each filter 100 illustrated in FIG. 5A. As illustrated in FIG. 6A, the reflective layer 24 includes a DBR in which first refractive-index layers 24a and second refractive-index layers 24b are alternately stacked. The DBR includes one or more pair layers of first refractive-index layers 24a and second refractive-index layers 24b having different refractive indices. The refractive index of the first refractive-index layers 24a is higher than the refractive index of the second refractive-index layers 24b. A distributed Bragg reflector has a wavelength range with high reflectance in accordance with Bragg reflection occurring due to a periodical structure. Such a wavelength range is also called a stop band. When the number of aforementioned pair layers is increased, the reflectance in the stop band approaches 100%.

A wavelength within the target wavelength range W will be defined as $\lambda$, the refractive index of the first refractive-index layers 24a will be defined as $n_H$, and the refractive index of the second refractive-index layers 24b will be defined as $n_L$. A DBR including one or more pair layers of first refractive-index layers 24a having a thickness of $\lambda/(4n_H)$ and second refractive-index layers 24b having a thickness of $\lambda/(4n_L)$ efficiently reflects light with the wavelength $\lambda$. If the target wavelength range W is a range greater than or equal to a wavelength $\lambda_i$ and less than or equal to a wavelength $\lambda_f$, the DBR can include a pair layer corresponding to the wavelength $\lambda_i$ to a pair layer corresponding to the wavelength $\lambda_f$ by varying the thicknesses of the first refractive-index layers 24a and the second refractive-index layers 24b in a stepwise fashion. As a result, the DBR can efficiently reflect all the light within the target wavelength range W.

The DBR may be composed of, for example, a material with low absorbance with respect to light within the target wavelength range W. If the target wavelength range W is within the visible-light region, the material may be at least one selected from the group consisting of $SiO_2$, $Al_2O_3$, $SiO_xN_y$, $Si_3N_4$, $Ta_2O_5$, and $TiO_2$. If the target wavelength range W is within the infrared region, the material may be at least one selected from the group consisting of monocrystalline Si, polycrystalline Si, and amorphous Si, in addition to $SiO_2$, $Al_2O_3$, $SiO_xN_y$, $Si_3N_4$, $Ta_2O_5$, and $TiO_2$ mentioned above.

The interference layer 26 has a lower surface $26s_1$ in contact with the reflective layer 24 and also has an upper surface $26s_2$ at the opposite side thereof. In the filter 100 illustrated in FIG. 6A, the lower surface $26s_1$ corresponds to a first surface, and the upper surface $26s_2$ corresponds to a second surface. In the example illustrated in FIG. 6A, the upper surface $26s_2$ is exposed to the outside and is in contact with the air. A transparent layer may be further stacked on the interference layer 26. In this case, the upper surface $26s_2$ is in contact with the transparent layer. The reflectance (referred to as "first reflectance" hereinafter) of the lower surface $26s_1$ serving as the first surface with respect to light in the target wavelength range W may be, for example, higher than or equal to 80%. The first reflectance may be lower than 80%, but may be designed to be higher than or equal to 40% from the standpoint of suppressing reflection. The reflectance (referred to as "second reflectance" hereinafter) of the upper surface $26s_2$ serving as the second surface with respect to light in the target wavelength range W is lower than the first reflectance and may be, for example, higher than or equal to 1% and lower than 30%. There is a fixed difference of 10% or more between the first reflectance and the second reflectance.

On the other hand, in the filters 100 of the light detection device 300 illustrated in FIG. 5B, the reflective layer 24 is disposed over the upper surface of the interference layer 26. In the filters 100 of the light detection device 300 illustrated in FIG. 5B, the upper surface of the interference layer 26 corresponds to the first surface, and the lower surface corresponds to the second surface.

In this description, unless an accurate position of a surface that reflects light becomes a problem, the light within the interference layer 26 is reflected at the lower surface $26s_1$ serving as the first surface and the upper surface $26s_2$ serving as the second surface. In this embodiment, a portion of light incident on the reflective layer 24 from the interference layer 26 actually enters the reflective layer 24 so as to be reflected at the interfaces between the first refractive-index layers 24a and the second refractive-index layers 24b. The interfaces where the light is reflected vary depending on the wavelength. However, for the sake of convenience, these beams of light are treated as being reflected at the lower surface $26s_1$ serving as the first surface.

The reflection of the light at the lower surface $26s_1$ and the upper surface $26s_2$ causes standing waves to be formed within the interference layer 26. As a result, if the thickness of the interference layer 26 is greater than or equal to a predetermined value, the transmission spectrum of each filter 100 has maximum transmission values at various wavelengths in the target wavelength range W. In other words, the transmission spectrum of the filter 100 has peaks within the target wavelength range W. In this description, such a filter will be referred to as "multimode filter".

If the DBR includes a pair layer corresponding to the wavelength $\lambda$, the thickness of the interference layer 26 that can realize a multimode filter may be, for example, twice the thickness of the first refractive-index layers 24a, that is, greater than or equal to $\lambda/(2n_H)$. A multimode filter may be realized by appropriately designing the refractive index of the interference layer 26 instead of the thickness of the interference layer 26. Alternatively, a multimode filter may be realized by appropriately designing both the refractive index and the thickness of the interference layer 26.

The interference layer 26 may be composed of a material similar to that of the DBR. The interference layer 26 is not limited to a single layer and may include stacked layers. Such layers may be composed of different materials. The layers may have different refractive indices to an extent that they do not have a substantial effect on the transmission spectrum of each filter 100. Reflection may occur at the interfaces between layers with different refractive indices. However, the layers may be regarded as a substantially uniform part of the interference layer 26 so long as they do not have a substantial effect on the transmission spectrum. A permissible relative error in the refractive indices is greater than or equal to 0% and less than or equal to 9%. The relative error is a value obtained by dividing an absolute value of a difference between a maximum refractive index and a minimum refractive index by the maximum refractive index. For example, the refractive indices in the visible-light regions of $Ta_2O_5$ and $Si_3N_4$ are 2.2 and 2.05, respectively. The relative error in these refractive indices is about 7%. Therefore, the stacked $Ta_2O_5$ and $Si_3N_4$ layers may be regarded as a substantially uniform part of the interference layer 26.

In the following description, the structure illustrated in FIG. 6A will be referred to as "single-sided DBR structure". In addition to the structure illustrated in FIG. 6A, a structure having a reflective layer 24 additionally stacked on the interference layer 26 will be referred to as "double-sided DBR structure". In the single-sided DBR structure, a reflective layer is provided on one of the lower surface 26s₁ and the upper surface 26s₂ of the interference layer 26, but is not provided on the other surface. In the double-sided DBR structure, reflective layers are provided on both the lower surface 26s₁ and the upper surface 26s₂ of the interference layer 26.

Figure 6B:
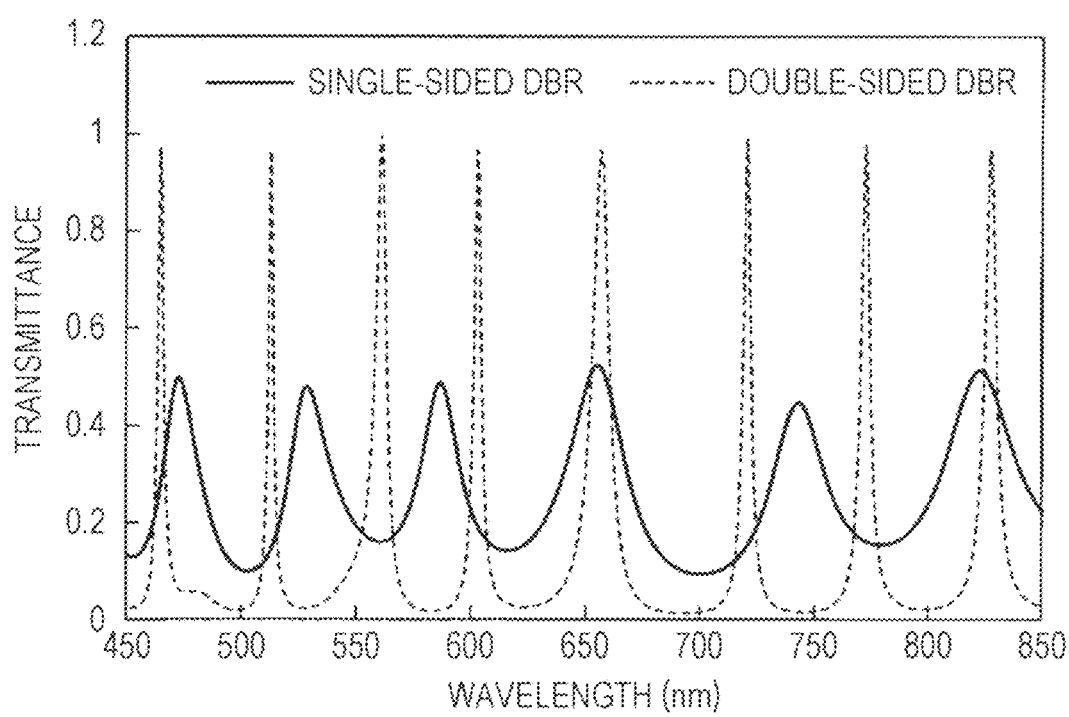
FIG. 6B illustrates an example of transmission spectra that a single-sided distributed-Bragg-reflector (DBR) structure and a double-sided DBR structure have in vertical incidence.

Next, an example of transmission spectra of the filters 100 will be described with reference to FIG. 6B. FIG. 6B illustrates an example of light transmission spectra of the single-sided DBR structure and the double-sided DBR structure when light vertically enters the structures. In the example illustrated in FIG. 6B, the target wavelength range W is greater than or equal to 450 nm and less than or equal to 850 nm. A solid line illustrated in FIG. 6B indicates the transmission spectrum of the single-sided DBR structure. A dashed line in FIG. 6B indicates the transmission spectrum of the double-sided DBR structure. As illustrated in FIG. 6B, multimode filters can be obtained from both the single-sided DBR structure and the double-sided DBR structure. However, the characteristics of the multimode filters of the two structures are different from each other with respect to the following points. The transmission spectrum of the single-sided DBR structure has wide peaks and has maximum transmittance of about 0.5 and minimum transmittance of about 0.1. In contrast, the transmission spectrum of the double-sided DBR structure has acute peaks and has maximum transmittance of about 1.0 and minimum transmittance of about 0.02.

In the single-sided DBR structure, the base line of the transmittance rises, as compared with the double-sided DBR structure. In this example, the average transmittance within the target wavelength range W in the single-sided DBR structure is approximately 26%, and the average transmittance within the target wavelength range W in the double-sided DBR structure is approximately 14%. In the single-sided DBR structure, the average transmittance is about twice that in the double-sided DBR structure. Accordingly, the single-sided DBR structure can suppress a loss in the detection light intensity during an imaging process.

Figure 7A:
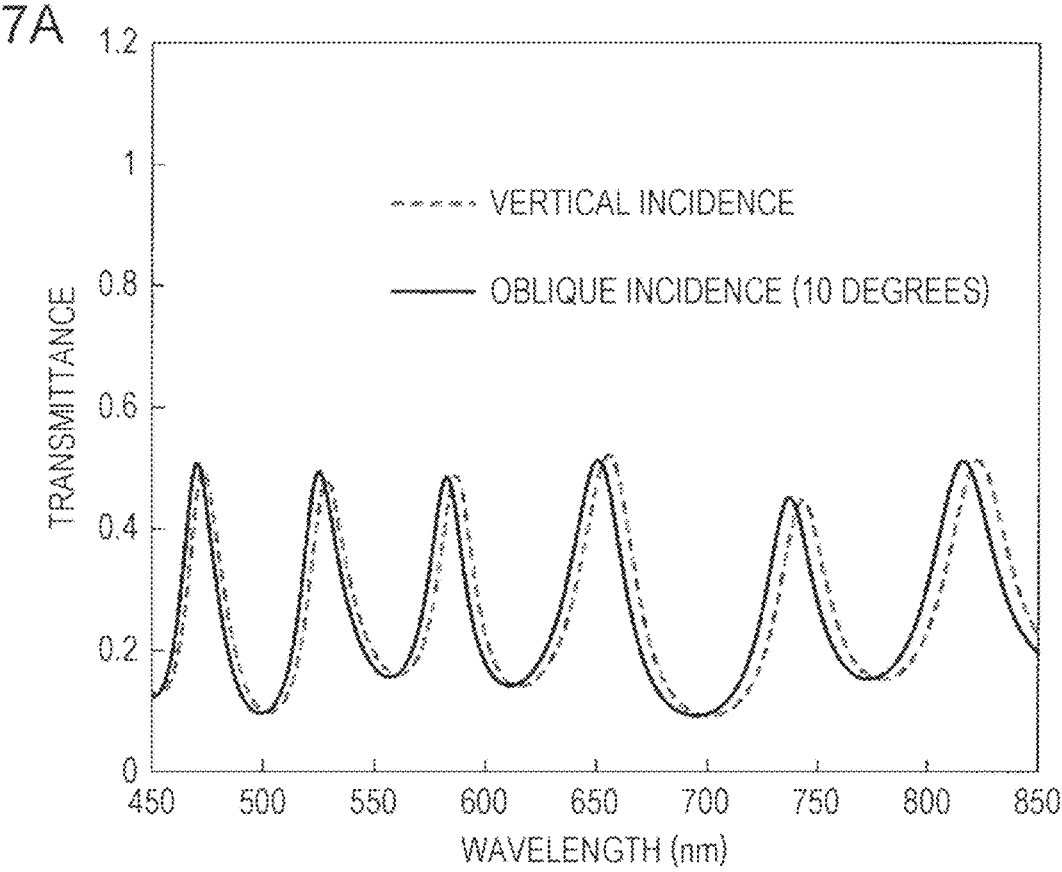
FIG. 7A illustrates an example of transmission spectra that the single-sided DBR structure has in 10-degree oblique incidence and vertical incidence.
Figure 7B:
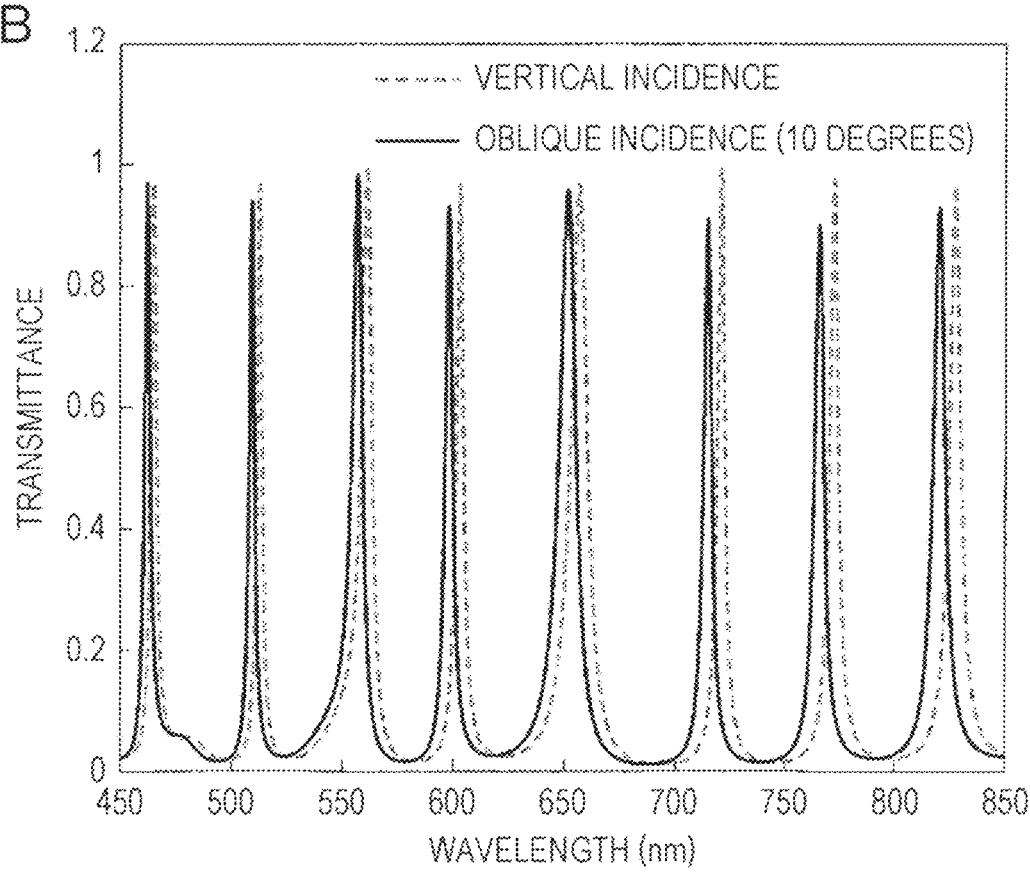
FIG. 7B illustrates an example of transmission spectra that the double-sided DBR structure has in 10-degree oblique incidence and vertical incidence.

Next, changes in transmission spectra occurring in accordance with the light incident angle will be described with reference to FIGS. 7A and 7B. FIG. 7A illustrates an example of transmission spectra that the single-sided DBR structure has in 10-degree oblique incidence and vertical incidence. FIG. 7B illustrates an example of transmission spectra that the double-sided DBR structure has in 10-degree oblique incidence and vertical incidence. A solid line illustrated in each of FIGS. 7A and 7B indicates oblique incidence, and a dashed line illustrated in each of FIGS. 7A and 7B indicates vertical incidence. As illustrated in FIGS. 7A and 7B, the transmission spectra shift toward the shorter wavelength side due to oblique incidence in both the single-sided DBR structure and the double-sided DBR structure. In these examples, when an absolute value of a difference between the transmission spectra in oblique incidence and vertical incidence is averaged within the target wavelength range W, the average value is approximately 4% in the single-sided DBR structure and approximately 12% in the double-sided DBR structure. It is apparent that the transmission spectra of the single-sided DBR structure are more robust relative to a change in the light incident angle than the transmission spectra of the double-sided DBR structure. This is because the transmission spectra of the single-sided DBR structure have wider peaks than the transmission spectra of the double-sided DBR structure. With reference to a peak wavelength at which the transmission has a maximum value in vertical incidence, even if a wide peak shifts toward the shorter wavelength side due to oblique incidence, the transmittance at the peak wavelength does not significantly decrease. In contrast, when an acute peak shifts toward the shorter wavelength side due to oblique incidence, the transmittance at the peak wavelength significantly decreases.

If all the filters 100 in the filter array 10 include single-sided DBR structures, the components that the matrix H has in Expression (1) do not significantly change even when the light incident angle changes. Therefore, when spectral images 220 are generated in a reconstruction process from an image captured using such a filter array 10, deterioration in the spectral resolution of the spectral images 220 can be suppressed.

Next, other examples of the light detection device 300 will be described with reference to FIGS. 8A to 10B.

Figure 8A:
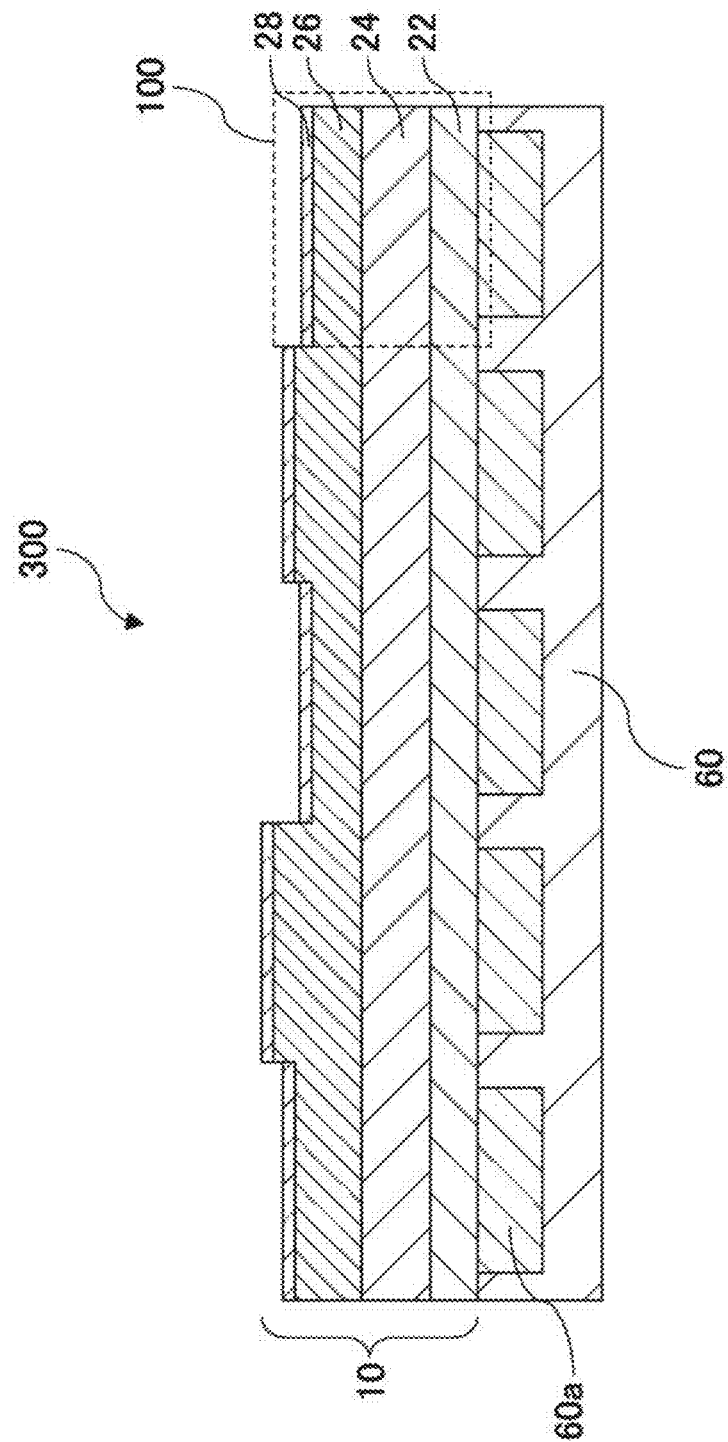
FIG. 8A is a cross-sectional view schematically illustrating a third example of the light detection device.
Figure 8B:
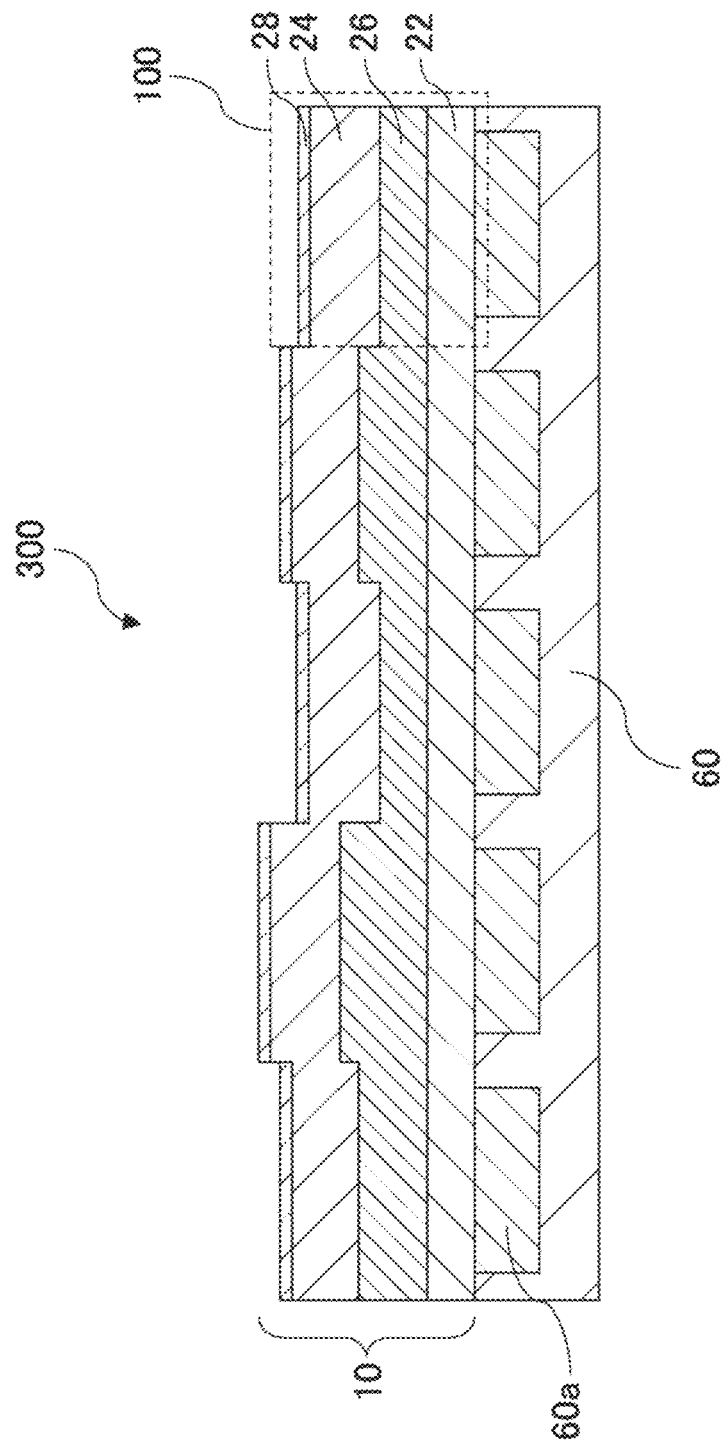
FIG. 8B is a cross-sectional view schematically illustrating a fourth example of the light detection device.

FIGS. 8A and 8B are cross-sectional views schematically illustrating third and fourth examples, respectively, of the light detection device 300. In the third example illustrated in FIG. 8A, the resonant cavity in each filter 100 further includes a transparent layer 28 stacked on the interference layer 26, in addition to the multilayer structure illustrated in FIG. 5A. In the third example, the transparent layer 28 is located opposite the reflective layer 24 with reference to the interference layer 26. In the third example, the interference layer 26 is disposed between the transparent layer 28 and the reflective layer 24. In the fourth example illustrated in FIG. 8B, the resonant cavity in each filter 100 further includes a transparent layer 28 stacked on the reflective layer 24, in addition to the multilayer structure illustrated in FIG. 5B. In the fourth example, the transparent layer 28 is located at the same side as the reflective layer 24 with reference to the interference layer 26. In the fourth example, the reflective layer 24 is disposed between the transparent layer 28 and the interference layer 26. In the third and fourth examples, the transparent layer 28 may function as, for example, a protection layer and/or an anti-reflection film for the reflective layer 24 or the interference layer 26.

In the third example, the transparent layer 28 may be composed of, for example, a material having low absorbance with respect to light within the target wavelength range W and having a lower refractive index than the interference layer 26. In a case where the interference layer 26 is composed of $Ta_2O_5$ or $TiO_2$, the material may be at least one selected from the group consisting of $Al_2O_3$ and $SiO_2$. The refractive indices in the visible-light regions of $Ta_2O_5$ and $TiO_2$ are 2.2 and 2.4, respectively. The refractive indices in the visible-light regions of $Al_2O_3$ and $SiO_2$ are 1.77 and 1.46, respectively. If the product of the refractive index and the thickness of the transparent layer 28 is smaller than ¼ of the shortest wavelength $\lambda_{min}$, within the target wavelength range W, a material with a higher refractive index than the interference layer 26 may be used as the material of the transparent layer 28. In the fourth example, the transparent layer 28 may be composed of, for example, a material having low absorbance with respect to light within the target wavelength range W and having a lower refractive index than the first refractive-index layer 24a or second refractive-index layer 24b of the reflective layer 24 located closest to the transparent layer 28. If the product of the refractive index and the thickness of the transparent layer 28 is smaller than ¼ of the shortest wavelength $\lambda_{min}$, within the target wavelength range W, a material with a higher refractive index than the first refractive-index layer 24a or second refractive-index layer 24 may be used as the material of the transparent layer 28.

In the third and fourth examples, the transparent layer 28 may be exposed to atmospheric air. Components, such as a lens and a protection cover, may be disposed above the surface of the transparent layer 28 with a space therebetween. In this case, the space may be filled with atmospheric air, or may be sealed with gas, such as nitrogen gas.

FIGS. 9A and 9B are cross-sectional views schematically illustrating fifth and sixth examples, respectively, of the light detection device 300. In the fifth example illustrated in FIG. 9A, the resonant cavity in each filter 100 further includes a transparent layer 28 stacked on the interference layer 26 and micro-lenses 40a disposed on the transparent layer 28, in addition to the multilayer structure illustrated in FIG. 5A. In the fifth example, the transparent layer 28 and the micro-lenses 40a are located opposite the reflective layer 24 with reference to the interference layer 26. In the sixth example illustrated in FIG. 9B, the resonant cavity in each filter 100 further includes a transparent layer 28 stacked on the reflective layer 24 and micro-lenses 40a disposed on the transparent layer 28, in addition to the multilayer structure illustrated in FIG. 5B. In the sixth example, the transparent layer 28 and the micro-lenses 40a are located at the same side as the reflective layer 24 with reference to the interference layer 26. The material of the transparent layer 28 is as described above. As illustrated in FIGS. 9A and 9B, the transparent layer 28 flattens out steps between neighboring filters 100. As a result, the micro-lenses 40a can be readily disposed. The transparent layer 28 functions as a spacer that supports the micro-lenses 40a. The reflective layer 24 and the micro-lenses 40a may have a gas-filled space therebetween instead of the transparent layer 28. By using the micro-lenses 40a to collect incident light, the light detection elements 60a can efficiently detect the light.

Figure 10A:
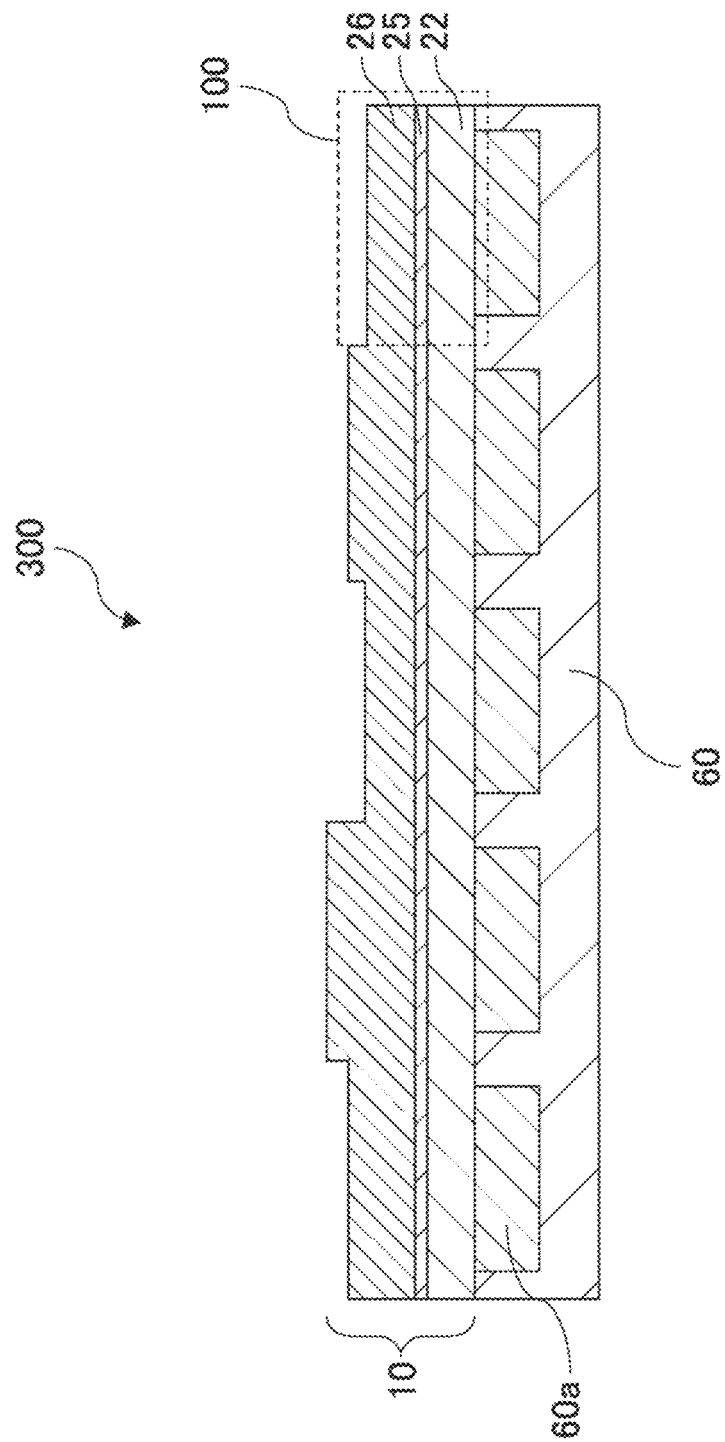
FIG. 10A is a cross-sectional view schematically illustrating a seventh example of the light detection device.
Figure 10B:
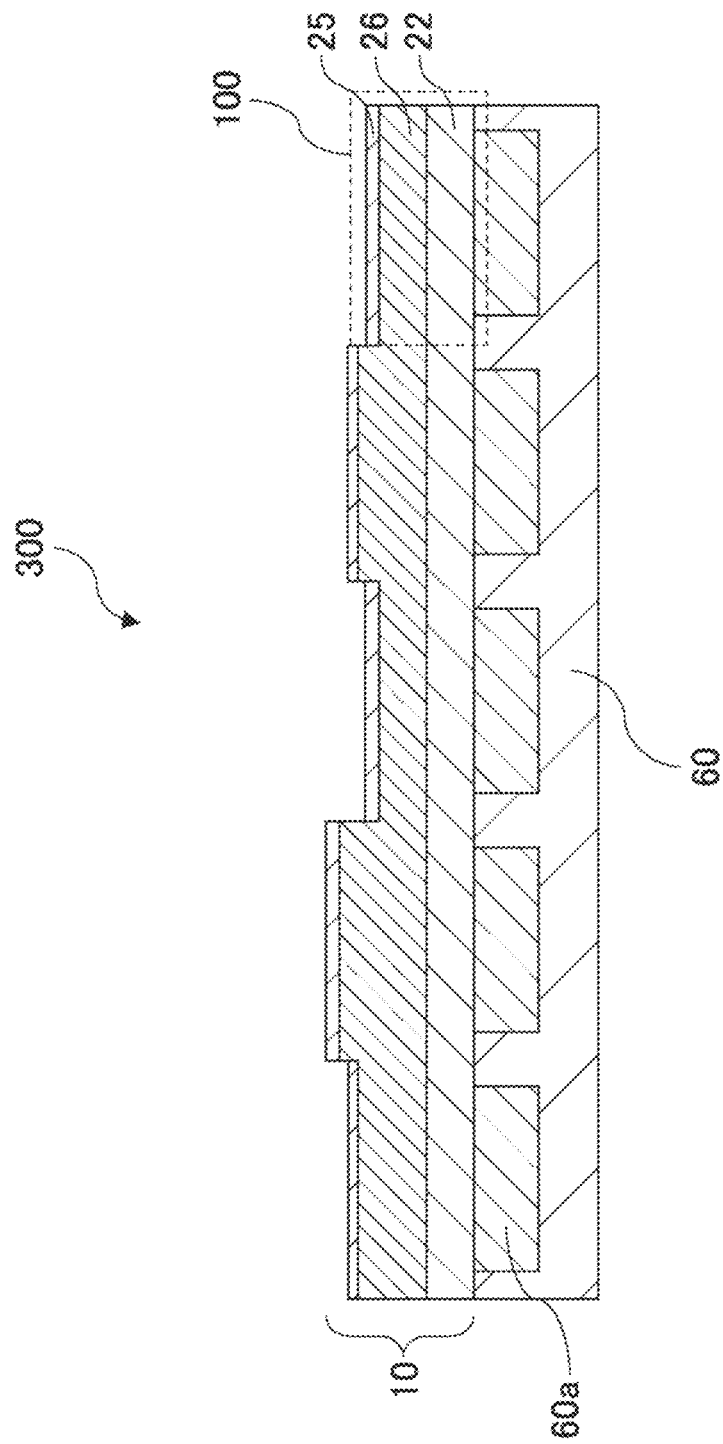
FIG. 10B is a cross-sectional view schematically illustrating an eighth example of the light detection device.

FIGS. 10A and 10B are cross-sectional views schematically illustrating seventh and eighth examples, respectively, of the light detection device 300. The seventh and eighth examples are different from the first and second examples in that a reflective layer 25 includes a metallic film instead of a DBR. The reflectance in the target wavelength range W of the metallic film is dependent on the material of the metallic film. An absorption coefficient in the target wavelength range W of the metallic film is dependent on the thickness of the metallic film.

The metallic film may be composed of a material whose reflectance in the target wavelength range W is higher than or equal to 90%. If the target wavelength range W is within the visible-light region, the material of the metallic film with the reflectance being higher than or equal to 90% may be at least one selected from the group consisting of Ag and Al. If the target wavelength range W is within the infrared region, the material of the metallic film with the reflectance being higher than or equal to 90% may be at least one selected from the group consisting of Ag, Al, Au, and Cu. Even if the metallic film has relatively low reflectance, the metallic film is still useful in that the reflectance is suppressed. For example, the metallic film may be composed of a material whose reflectance in the target wavelength range W is higher than or equal to 40% and lower than or equal to 70%. If the target wavelength range W is within the visible-light region or the infrared region, the material of the metallic film with the reflectance being higher than or equal to 40% and lower than or equal to 70% may be at least one selected from the group consisting of Ni and Pt. The metallic film may be composed of an alloy. The metallic film may be provided by plating.

The thickness of the metallic film may be, for example, larger than or equal to 1 nm and smaller than or equal to 100 nm. In this case, the transmittance of the metallic film from the visible-light region to the infrared region may relatively increase. The thickness of the metallic film may be smaller than or equal to several tens of nm. If the metallic film is too thick, the incident light cannot be transmitted through the metallic film. Thus, the light detection elements 60a cannot detect transmission light of the metallic film.

In the third to sixth examples of the light detection device 300, the reflective layer 24 including the DBR may be replaced with the reflective layer 25 including the metallic film.

Next, modifications of the first example illustrated in FIG. 5A will be described with reference to FIGS. 11A to 11D. FIGS. 11A to 11D schematically illustrate modifications of the first example illustrated in FIG. 5A.

As illustrated in FIG. 11A, in the filter array 10, the filters 100 may be segmented. Not all the filters 100 have to be segmented, and one or more of the filters 100 may be segmented.

As illustrated in FIG. 11B, the filters 100 do not have to be disposed on one or more of the light detection elements 60a. In other words, in the filter array 10, at least one of the filters 100 may be transparent.

As illustrated in FIG. 11C, the filter array 10 and the image sensor 60 may have a space provided therebetween. In other words, the filter array 10 and the image sensor 60 may be separated from each other by a space.

Figure 11D:
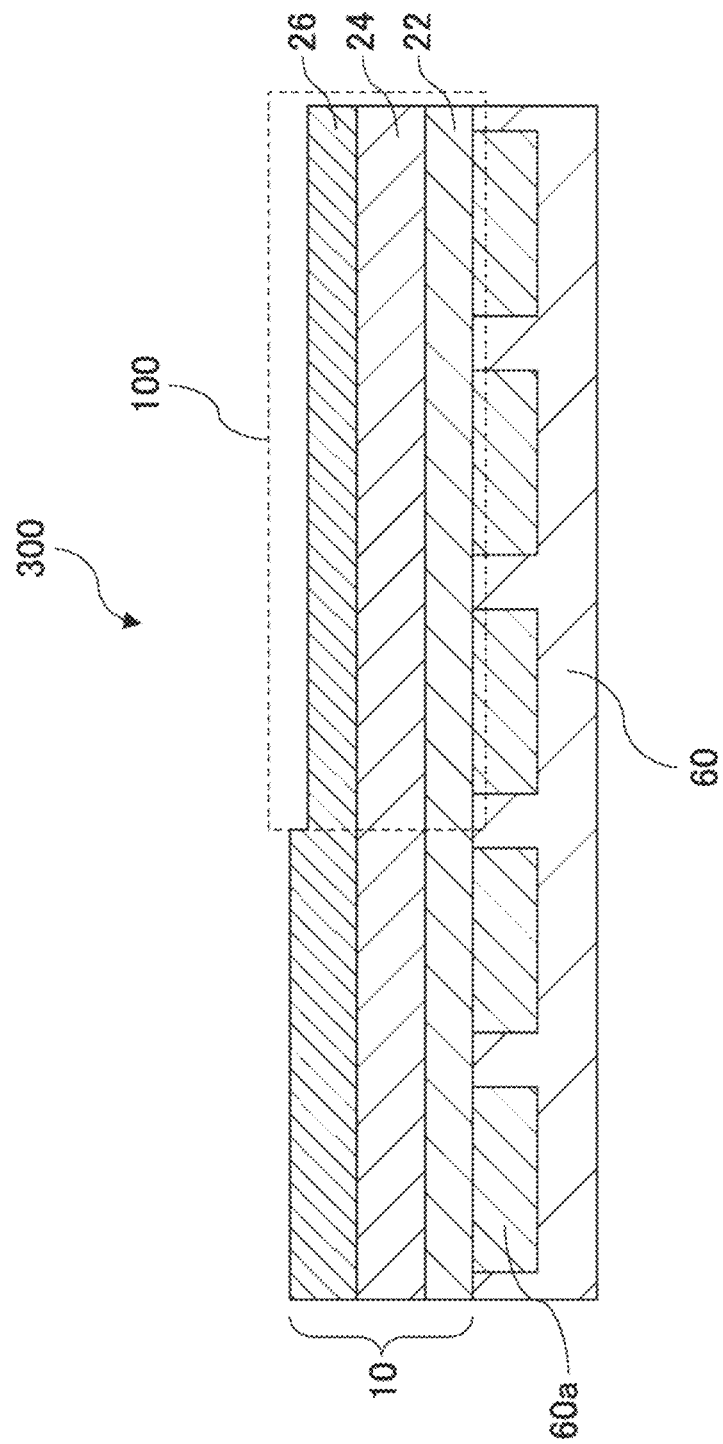
FIG. 11D schematically illustrates a fourth modification of the first example illustrated in FIG. 5A.

As illustrated in FIG. 11D, one filter 100 may be disposed over light detection elements 60a. In other words, the interference layer 26 may be provided uniformly throughout two or more filters 100 without any steps.

The modifications of the first embodiment may similarly be applied to the second to eight examples of the light detection device 300.

The light detection system and the filter array according to the present disclosure may be used in, for example, a camera and a measurement device that acquire a multi-wavelength two-dimensional image. The light detection system and the filter array according to the present disclosure are also applicable to, for example, biological, medical, or cosmetic-oriented sensing, a system for inspecting foreign matter and residual pesticides in food, a remote sensing system, and a vehicular sensing system.

What is claimed is:
1. A filter array comprising:
optical filters that are disposed in a two-dimensional plane,
wherein the optical filters include a first filter and a second filter,
wherein the first filter includes
a first interference layer having a first surface and a second surface opposite the first surface, and
a first reflective layer provided on the first surface,
wherein the second filter includes
a second interference layer having a third surface and a fourth surface opposite the third surface, and
a second reflective layer provided on the third surface,
wherein a transmission spectrum of each of the first filter and the second filter has maximum values,
wherein the first interference layer and the second interference layer differ in thickness, refractive-index, or thickness and refractive-index, and
wherein a reflective layer is not provided on the second surface.

2. The filter array according to claim 1,
wherein each of the first reflective layer and the second reflective layer includes at least one selected from the group consisting of a distributed Bragg reflector and a metallic film.

3. The filter array according to claim 2,
wherein the distributed Bragg reflector includes at least one set of a first refractive-index layer and a second refractive-index layer, and
wherein a refractive index of the first refractive-index layer is higher than a refractive index of the second refractive-index layer.

4. The filter array according to claim 3,
wherein a thickness of the first refractive-index layer is)/(4 nH) and a thickness of the second refractive-index layer is $\lambda/(4 nL)$, and a thickness of the first interference layer is greater than $N/(2nH)$, where 2 denotes a wavelength included in a specific wavelength range having the maximum values, nH denotes the refractive index of the first refractive-index layer, and nL denotes the refractive index of the second refractive-index layer.

5. The filter array according to claim 2, wherein a thickness of the metallic film is larger than or equal to 1 nm and smaller than or equal to 100 nm.

6. The filter array according to claim 1,
wherein the first filter further includes a transparent layer, and
wherein the first interference layer is disposed between the transparent layer and the first reflective layer.

7. The filter array according to claim 1,
wherein the first filter further includes a transparent layer, and
wherein the first reflective layer is disposed between the transparent layer and the first interference layer.

8. The filter array according to claim 6,
wherein the first filter further includes a micro-lens located on the transparent layer.

9. A light detection system comprising:
the filter array according to claim 1; and
an image sensor that is disposed at a position where the image sensor receives light transmitted through the optical filters.

10. The light detection system according to claim 9, further comprising:
a processing circuit that generates spectral image data corresponding to each of wavelength bands based on data indicating a spatial distribution of transmission spectra of the optical filters and image data acquired by the image sensor,
wherein the first optical filter and the second optical filter have transmission spectra different from each other.

11. The filter array according to claim 1, wherein a reflective layer is not provided on the fourth surface.

12. The filter array according to claim 1,
wherein first light is light reflected from at least one of the first surface and the first reflective layer,
wherein second light is light reflected from the second surface, and
wherein the first light and the second light result in a standing wave within the first interference layer.

13. A filter array comprising:
optical filters that are disposed in a two-dimensional plane,
wherein the optical filters include a first filter and a second filter,
wherein the first filter includes
a first interference layer having a first surface and a second surface opposite the first surface, and
a first distributed Bragg reflector provided on the first surface,
wherein the second filter includes,
a second interference layer having a third surface and a fourth surface opposite the third surface, and
a second distributed Bragg reflector provided on the third surface,
wherein a transmission spectrum of each of the first filter and the second filter has maximum values,
wherein the first interference layer and the second interference layer differ in a thickness, a refractive-index, or the thickness and the refractive-index, and
wherein a distributed Bragg reflector is not provided on the second surface.

* * * * *